(12) United States Patent
Snead

(10) Patent No.: US 11,066,121 B1
(45) Date of Patent: Jul. 20, 2021

(54) HANDLEBAR INTEGRATED MASTER CYLINDER ASSEMBLY

(71) Applicant: SRAM, LLC, Chicago, IL (US)

(72) Inventor: Braden Snead, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/888,481

(22) Filed: May 29, 2020

(51) Int. Cl.
    *B62K 23/06*    (2006.01)
    *B62L 3/02*     (2006.01)

(52) U.S. Cl.
    CPC .............. *B62K 23/06* (2013.01); *B62L 3/023* (2013.01)

(58) Field of Classification Search
    CPC ....................................................... B62L 3/023
    See application file for complete search history.

(56) References Cited

U.S. PATENT DOCUMENTS

| 2014/0360303 A1* | 12/2014 | Meggiolan | B62M 25/08 74/488 |
| 2016/0327070 A1* | 11/2016 | Fujiwara | B62M 25/04 |
| 2017/0240244 A1* | 8/2017 | Kariyama | B62K 23/06 |

\* cited by examiner

*Primary Examiner* — Vicky A Johnson

(57) ABSTRACT

A fluid cylinder assembly for a hydraulic actuation system for a bicycle is provided. The fluid cylinder assembly includes a fluid cylinder. The fluid cylinder includes a housing and a piston that is movable within the housing. The fluid cylinder assembly also includes a force applicator connected to the piston of the fluid cylinder, a support, and an actuator pivotably attached to the support. The actuator is operatively connected to the piston of the fluid cylinder via the force applicator, such that the actuator is configured to translate the piston from a first position to a second position when the actuator is actuated. The fluid cylinder is attachable to a handlebar of the bicycle, such that part of the fluid cylinder is positioned within the handlebar and at least part of the force applicator is radially outer relative to the handlebar.

17 Claims, 24 Drawing Sheets

HANDLEBAR INTEGRATED MASTER CYLINDER ASSEMBLY

FIELD OF THE DISCLOSURE

The present disclosure is generally directed to a master cylinder assembly for a hydraulic actuation system for a bicycle and, more particularly, to a handlebar integrated master cylinder assembly.

DESCRIPTION OF RELATED ART

With the introduction of wireless shifting and remote technology for bicycles, many cables and housings in the cockpit area of bicycles of the prior art are no longer needed. The elimination of such cables and housing in the cockpit area provides a cleaner overall appearance for the bicycle.

SUMMARY

In one example, a fluid cylinder assembly for a hydraulic actuation system for a bicycle includes a fluid cylinder. The fluid cylinder includes a housing and a piston that is movable within the housing. The fluid cylinder assembly also includes a force applicator connected to the piston of the fluid cylinder, a support, and an actuator pivotably attached to the support. The actuator is operatively connected to the piston of the fluid cylinder via the force applicator, such that the actuator is configured to translate the piston from a first position to a second position when the actuator is actuated. The fluid cylinder is attachable to a handlebar of the bicycle, such that part of the fluid cylinder is positioned within the handlebar and at least a portion of the force applicator is radially outer relative to the handlebar.

In one example, the actuator includes a lever.

In one example, the force applicator is a pull rod member. The pull rod member is under tensile load when the actuator is actuated.

In one example, the pull rod member is a first pull rod member. The fluid cylinder assembly further includes a second pull rod member connected to the piston of the fluid cylinder. The second pull rod member is opposite the first pull rod member.

In one example, the force applicator is a flexible cable.

In one example, the housing of the fluid cylinder includes a fluid chamber having a first portion and a second portion. The first portion of the fluid chamber is in communication with the hydraulic actuation system. The piston is movable within the fluid chamber of the housing of the fluid cylinder. The first position of the piston is an open position permitting fluid flow between the first portion of the fluid chamber and the second portion of the fluid chamber, and the second position of the piston is a closed position blocking fluid flow between the first portion of the fluid chamber and the second portion of the fluid chamber.

In one example, the fluid cylinder further includes an adjuster configured to adjust a location of the first position of the piston relative to the housing of the fluid cylinder, such that a distance between the first position of the piston and the second position of the piston is adjusted.

In one example, the support has a first portion and a second portion. The first portion of the support is pivotably attached to the second portion of the support. The actuator is pivotably attached to the second portion of the support. The second portion of the support has an inner annular surface. The inner annular surface defines a clamp surface axis and a clamp plane. The clamp surface axis extends along the inner annular surface, and the clamp plane is perpendicular to the claim surface axis and intersects the second portion of the support. At least part of the force applicator is radially outer relative to the clamp surface axis.

In one example, the fluid cylinder and an end of the actuator are disposed on a same side of the clamp plane.

In one example, the fluid cylinder assembly further includes a hose connector supported by the housing of the fluid cylinder. The hose connector is radially inner relative to the clamp surface axis.

In one example, the fluid cylinder and the hose connector are on a same side of the clamp plane.

In one example, the part of the fluid cylinder is a first portion of the fluid cylinder, and the fluid cylinder also has a second portion. The fluid cylinder is attachable to the handlebar of the bicycle, such that the second portion of the fluid cylinder is positioned outside of the handlebar and abuts an end of the handlebar.

In one example, the fluid cylinder is attachable to the handlebar of the bicycle, such that the piston of the fluid cylinder extends beyond the end of the handlebar.

In one example, the fluid cylinder further includes a grip covering an outer surface of the second portion of the fluid cylinder, and a connector connecting the grip to the fluid cylinder via an opening through the grip and an opening through the second portion of the fluid cylinder.

In one example, the grip has an inner surface and a channel extending from the inner surface into the grip. The force applicator is disposed within the channel of the grip.

In one example, a fluid cylinder assembly for a hydraulic actuation system for a bicycle includes a fluid cylinder including a housing and a piston that is movable within the housing. The fluid cylinder assembly also includes a first tensile member and a second tensile member opposite the first tensile member. The first tensile member and the second tensile member are connected to the piston of the fluid cylinder. The first tensile member and the second tensile member are configured to translate the piston of the fluid cylinder when axial forces are applied to the first tensile member and the second tensile member, respectively.

In one example, the first tensile member is a first pull rod member, and the second tensile member is a second pull rod member. The fluid cylinder is attachable to a handlebar of the bicycle, such that part of the fluid cylinder is positioned within the handlebar and at least a portion of the first pull rod member and at least a portion of the second pull rod member are radially outer relative to the handlebar.

In one example, the fluid cylinder assembly further includes a support having a first portion and a second portion. The first portion of the support is pivotably attached to the second portion of the support. The first pull rod member and the second pull rod member are connected to the first portion of the support. The fluid cylinder assembly further includes an actuator pivotably attached to the second portion of the support and operatively connected to the piston of the fluid cylinder via the first pull rod member and the second pull rod member, such that the actuator is configured to translate the piston when the actuator is actuated.

In one example, a handlebar assembly for a bicycle includes a handlebar and a fluid cylinder assembly for a hydraulic actuation system for the bicycle. The fluid cylinder assembly includes a fluid cylinder attached to the handlebar. The fluid cylinder includes a housing and a piston that is movable within the housing. The fluid cylinder has a first portion and a second portion. The fluid cylinder assembly further includes a force applicator connected to the piston of the fluid cylinder, a support attached to the handlebar, and an actuator pivotably attached to the support. The actuator is operatively connected to the piston of the fluid cylinder via the force applicator, such that the actuator is configured to translate the piston when the actuator is actuated. The first portion of the fluid cylinder is disposed within the handlebar, and the second portion of the fluid cylinder is disposed outside of the handlebar and abuts an end of the handlebar. At least a portion of the force applicator is radially outer relative to the handlebar.

In one example, the handlebar assembly further includes a grip covering an outer surface of the second portion of the fluid cylinder, and a connector connecting the grip to the fluid cylinder via an opening through the grip and an opening through the second portion of the fluid cylinder. The support has a first portion and a second portion. The first portion of the support is pivotably attached to the second portion of the support. The force applicator is connected to the first portion of the support, and the actuator is pivotably attached to the second portion of the support. Part of the grip is disposed between the second portion of the support and the handlebar, and the grip is attached to the handlebar via the attachment of the support to the handlebar.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

While many cables and housings have been eliminated from the cockpit area of the bicycle with the introduction of wireless shifting and remote technology, brake hydraulic hoses remain. According to the present disclosure, the brake hydraulic hoses are positioned within a handlebar of the bicycle to improve the aesthetics of the cockpit, reduce weight, improve aerodynamics, and reduce the risk of catching the brake hydraulic hoses on trail side brush or obstacles.

According to the present disclosure, a fluid cylinder assembly (e.g., a master cylinder assembly) includes a fluid cylinder (e.g., a master cylinder) that is partially positioned within the handlebar (e.g., handlebar integrated) and partially positioned within a grip that also covers a portion of the handlebar. A first portion of the master cylinder fits within an inner diameter of the handlebar, and a second portion of the master cylinder abuts an end of the handlebar. The master cylinder includes a housing and a piston that is movable within the housing of the master cylinder.

The piston extends beyond the end of the handlebar and is connected to an actuator such as a lever with one or more force applicators (e.g., rod members). The one or more rod members, for example, extend axially along an outer surface of the handlebar and within the grip. For example, the one or more rod members extend along the outer surface of the handlebar within corresponding channels within the grip. The grip fits over the second portion of the master cylinder and part of the handlebar. The grip is connected to the second portion of the master cylinder with, for example, a threaded bolt connection, such that the master cylinder and the grip do not move relative to each other in an axial direction of the handlebar.

The master cylinder assembly of the present disclosure provides the same rider facing features as externally mounted master cylinder assemblies of the prior art. For example, the master cylinder assembly of the present disclosure provides a variable mechanical leverage rate, reach adjustment, dead-stroke adjustment (e.g., lever contact point adjustment), and a range of mounting angles of a lever of the master cylinder assembly relative to the handlebar. Unlike configurations of the prior art, in which a number of holes are added to strength critical areas of the handlebar to allow for hydraulic hose exit, in the present disclosure, the hydraulic hoses exit the handlebar through a single hole through the handlebar outside of the strength critical areas. The single hole through the handlebar outside of the strength critical areas of the handlebar does not compromise the structural integrity of a safety critical component, the handlebar.

Figure 1:
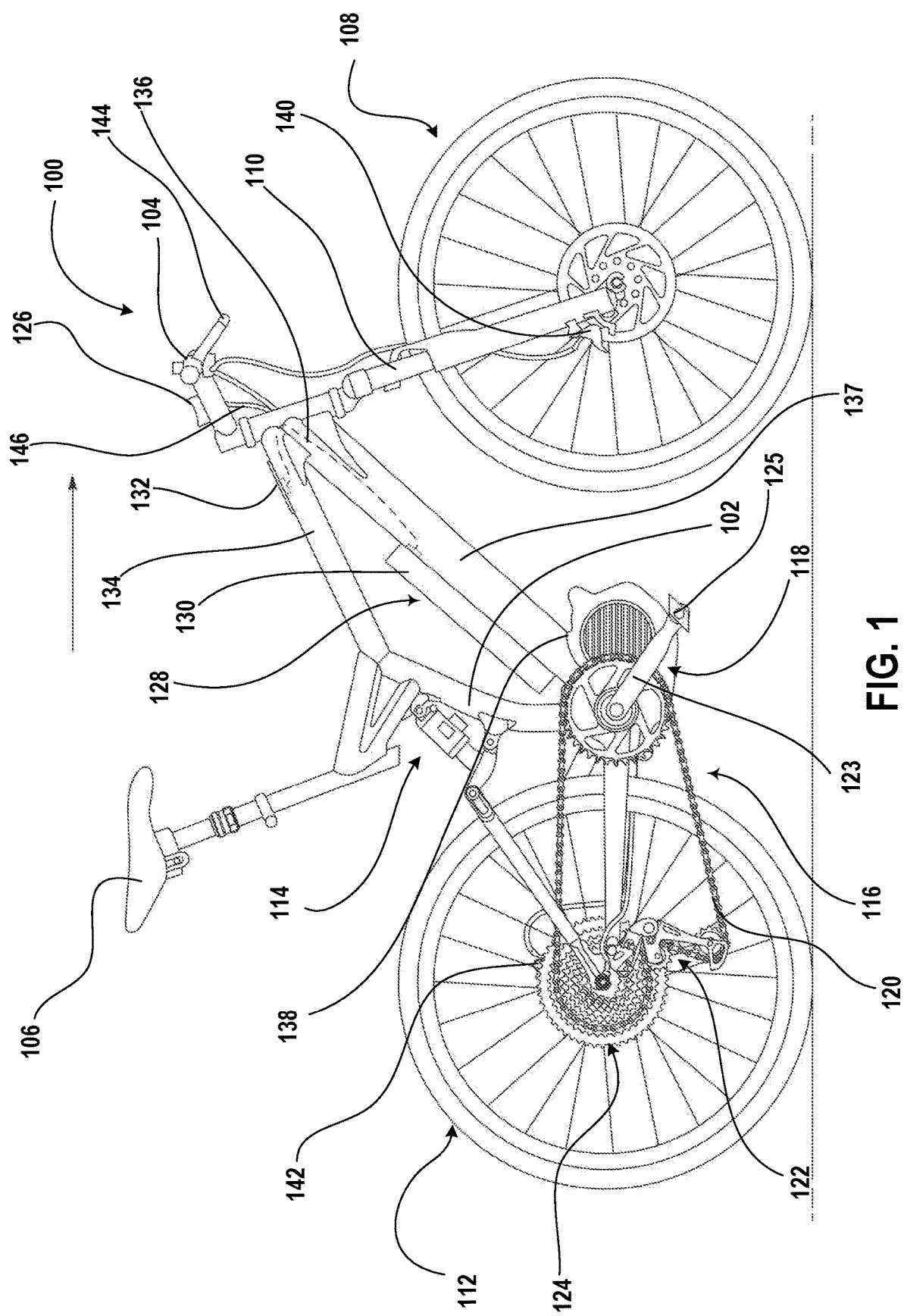
FIG. 1 is a side view schematic of an e-bike that may be fitted with a handlebar integrated master cylinder assembly in accordance with the teachings of this disclosure.

Turning now to the drawings, FIG. 1 generally illustrates one example of a bicycle 100 on which the disclosed master cylinder assembly may be implemented. In this example, the bicycle 100 may be a mountain bicycle. In some cases, the bicycle 100 may be an e-bike. The bicycle 100 has a frame 102, a handlebar 104 near a front end of the frame 102, and a seat or saddle 106 for supporting a rider over a top of the frame 102. The bicycle 100 also has a first or front wheel 108 carried by a front fork 110 of the frame 102 and supporting the front end of the frame 102. The bicycle 100 also has a second or rear wheel 112 supporting a rear end of the frame 102. The rear end of the frame 102 may be connected to a rear suspension component 114. The bicycle 100 also has a drive train 116 with a crank assembly 118 that is operatively coupled via a chain 120 and a rear derailleur 122 to a rear cassette 124 near a rotation axis of the rear wheel 112. The crank assembly 118 includes two cranks 123 and two pedals 125 connected to the two cranks 123, respectively, on opposite sides of the frame 102 of the bicycle 100.

In the example shown, the rear derailleur 122 includes a power source (e.g., a battery) and a motor, and receives instructions (e.g., wirelessly) from a controller 126 (e.g., a shifter or a central controller) mounted, for example, to the handlebar 104 or an interface of the present embodiments to shift gears on the rear cassette 124. In one embodiment, the rear derailleur 112 receives instructions from an e-bike control system 128 (e.g., including one or more processors, control circuitry, and/or a power source 130) to shift gears on the rear cassette 124. The rear derailleur 122 shift gears using the power source and the motor of the rear derailleur 122, based on the received instructions.

In one embodiment, the rear derailleur 122 is powered by a power source outside of the rear derailleur 122. For example, the rear derailleur 122 is powered by the power source 130 (e.g., a battery) of the e-bike control system 128. In another embodiment, the rear derailleur 122 is connected to an input on the handlebar 104 (e.g., a shifter), for example, via a shifter cable and shifts gears on the rear cassette 122 based on movement of the shifter (e.g., by the rider), and thus the shifter cable.

An interface 132 may be mounted to the frame 102 of the bicycle 100. For example, the interface 132 may be mounted to a top tube 134 of the frame 102. The interface 132 may be coupled with the power source 130 (e.g., a battery) of the e-bike control system 128 via a wire 136.

The battery 130 of the e-bike control system 128 is also supported by the frame 102 of the bicycle 100. For example, the battery 130 of the e-bike control system 128 is supported by a bottom tube 137 of the frame 102 of the bicycle 100. The wire 136 extends, for example, through part of the bottom tube 137 of the frame 102 and part of the top tube 134 of the frame 102 to electrically connect the e-bike control system 128 (e.g., the battery 130) and the interface 132. Other components (e.g., the controller 126) may be coupled with the power source 130 of the e-bike control system 128 via other wires, respectively.

The power source 130 powers the interface 132 via the wire 136. The interface 132 may also receive data (e.g., instructions) from and/or send data to other components of the e-bike control system 128 (e.g., the one or more processors and/or the control circuitry) via the wire 136.

The power source 130 also powers a drive unit 138 (e.g., including an e-bike motor) that is operatively coupled to the crank assembly 118. In one embodiment, the interface 132 may also be powered by a separate battery to provide access to e-bike controls when the battery 130 of the e-bike control system 128 is not attached to the bicycle 100. The interface 132 may also be in communication with multiple external wireless devices with or without the battery 130 of the e-bike control system 128 being attached.

While shifting instructions for the rear derailleur 122, for example, may be transmitted wirelessly, the bicycle 100 may include a hydraulic braking system with hydraulic hoses. For example, a front brake 140 is provided for braking the front wheel 108, and a rear brake 142 is provided for braking the rear wheel 112. A brake lever 144 is carried on the handlebar 104 for actuating the front brake 140 or the rear brake 142, or both. If the brake lever 144 actuates only the front brake 140 or the rear brake 142, a second brake lever (not shown) may also be provided to actuate the other brake. Actuation of the brake lever 144 actuates the front brake 140 and/or the rear brake 142 via one or more hydraulic hoses 146.

While the bicycle 100 depicted in FIG. 1 is a mountain bicycle, the disclosed master cylinder assembly, including the specific embodiments and examples disclosed herein as well as alternative embodiments and examples, may be implemented on other types of bicycles. For example, the master cylinder assembly may be used on road bicycles, as well as bicycles with mechanical (e.g., cable, hydraulic, pneumatic, etc.) and non-mechanical (e.g., wired, wireless) drive systems. The disclosed master cylinder assembly may also be implemented on other types of two-, three-, and four-wheeled human powered vehicles as well.

While FIG. 1 shows the hydraulic hoses 146 outside of the handlebar 104 and the frame 102, part of the master cylinder assembly of the present disclosure is disposed within the handlebar 104, which allows the hydraulic hoses 146 to be routed through the handlebar 104 and/or the frame 102 to improve the aesthetics of the cockpit, reduce weight, improve aerodynamics, and reduce the risk of catching the hydraulic hoses 146 on trail side brush or obstacles.

The bicycle 100, for example, may include a single master cylinder assembly for control of the front brake 140 and/or the rear brake 142. Alternatively, the bicycle 100 may include two master cylinder assemblies disposed on opposite sides of the handlebar 104 for control of the front brake 140 and the rear brake 142, respectively.

Figure 2:
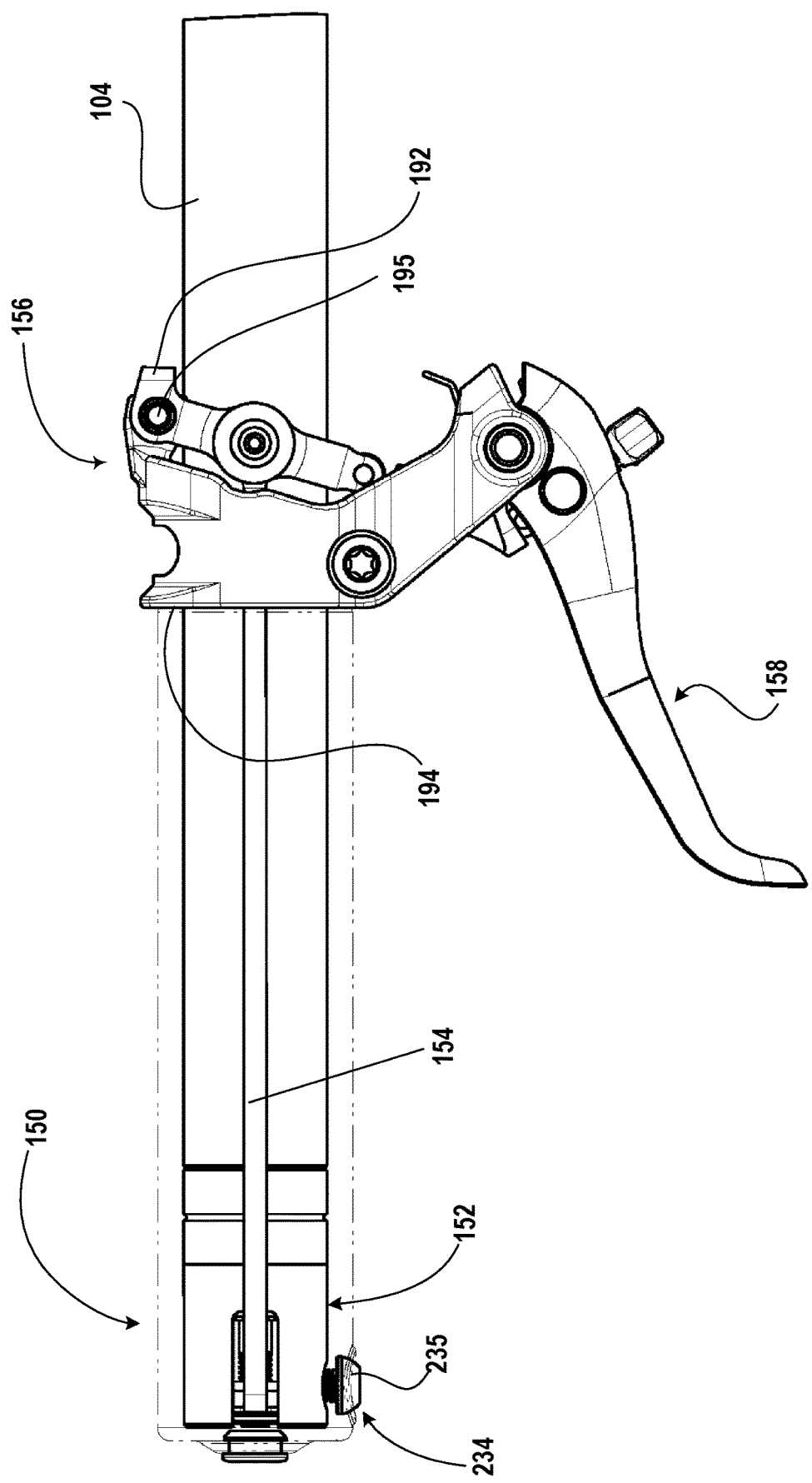
FIG. 2 is a side view of a first embodiment of a master cylinder assembly integrated with a handlebar of a bicycle, such as the bicycle of FIG. 1.
Figure 3:
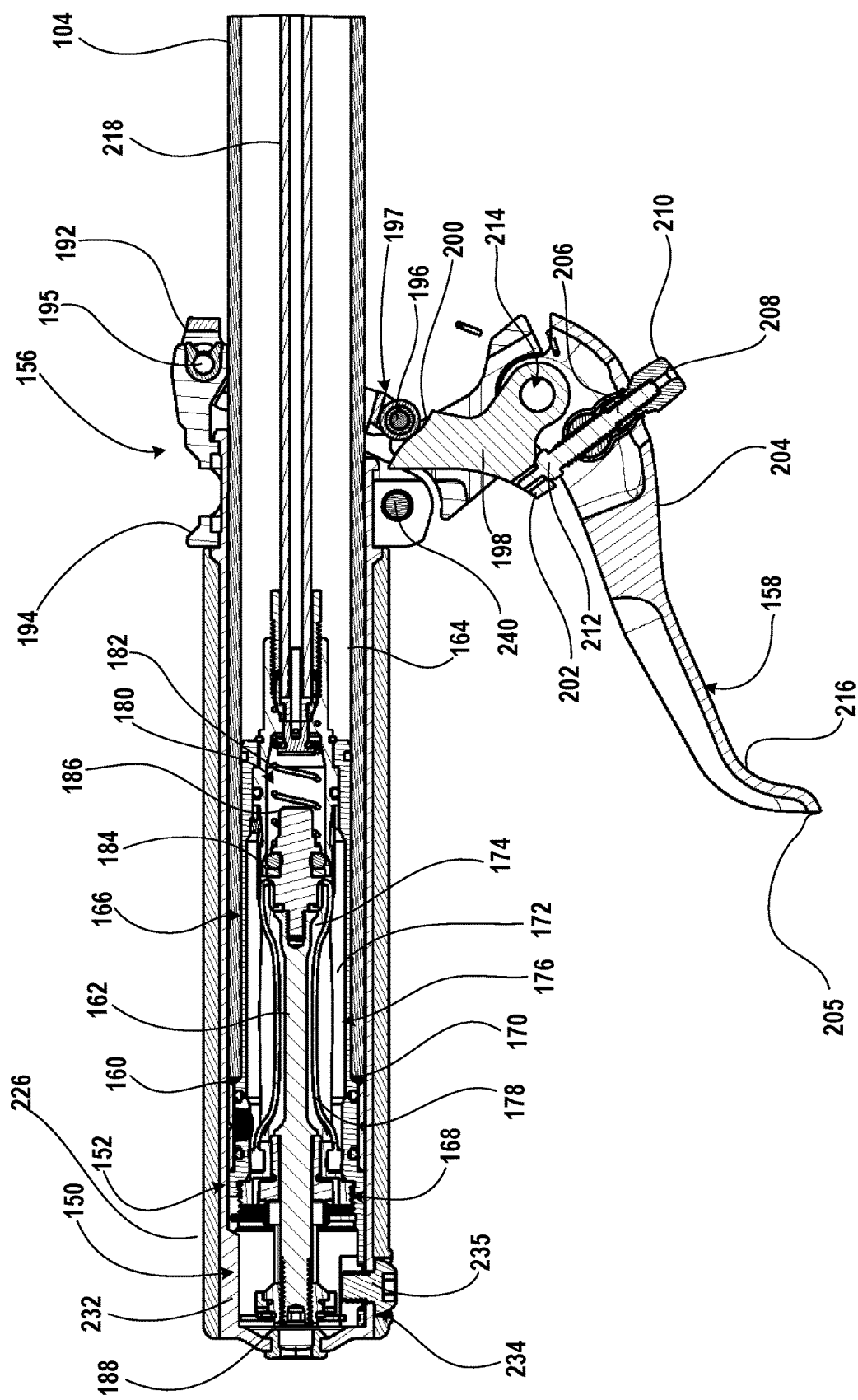
FIG. 3 is a side cross-sectional view of the handlebar integrated master cylinder assembly of FIG. 2 covered by a grip.
Figure 4:
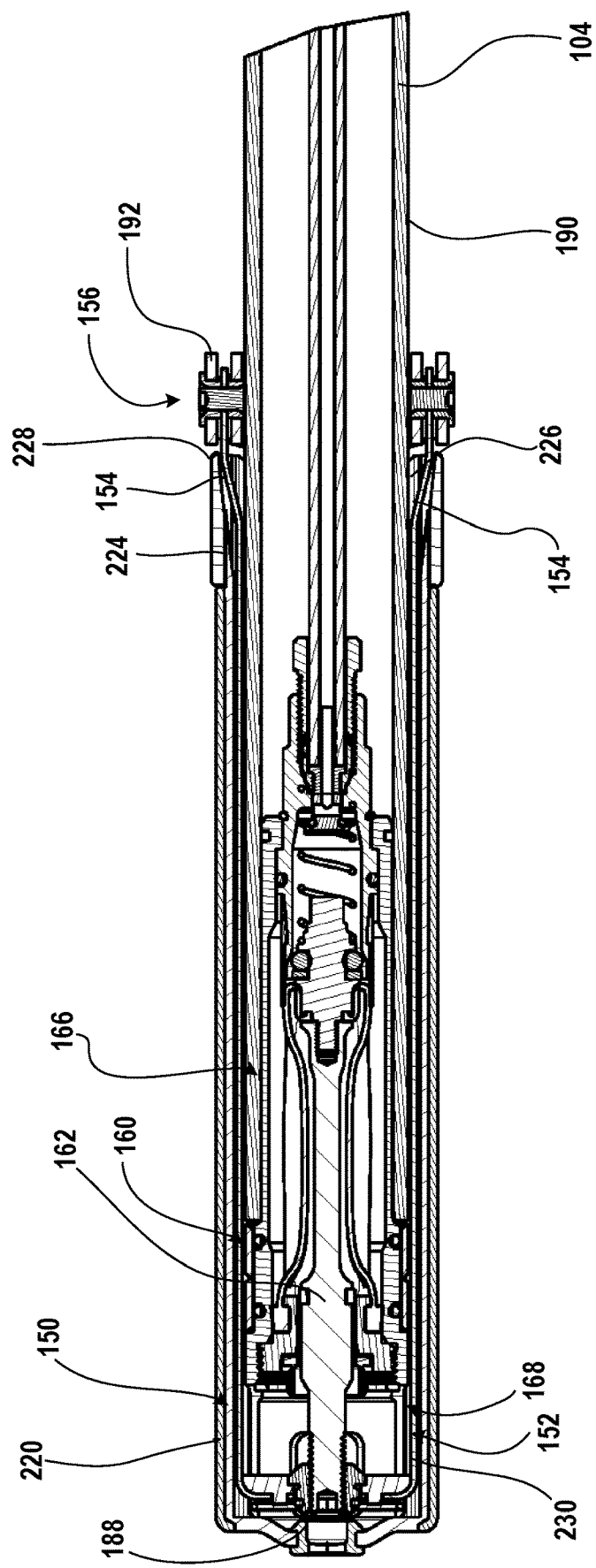
FIG. 4 is a top cross-sectional view of the handlebar integrated master cylinder assembly of FIG. 2 covered by a grip.

Referring to FIGS. 2-4, a master cylinder assembly 150 includes a master cylinder 152 (e.g., a master cylinder cartridge), a force applicator 154, a support 156, and an actuator 158 attached (e.g., pivotably attached) to the support 156.

Referring to FIGS. 3 and 4, the master cylinder 152 includes a housing 160 and a piston 162 that is movable within the housing 160. At least part of the master cylinder 152 fits within an inner diameter 164 of the handlebar 104. For example, the housing 160 of the master cylinder 152 includes a first portion 166 and a second portion 168 (e.g., corresponding to a first portion and a second portion of the master cylinder 152, respectively). The master cylinder 152 is attachable to the handlebar 104, such that the first portion 166 of the housing 160 of the master cylinder 152 is positioned within the handlebar 104 (e.g., such that an outer surface of the first portion 166 of the housing 160 abuts an inner surface of the handlebar 104) and the second portion 168 of the housing 160 of the master cylinder 152 is positioned outside of the handlebar 104 and abuts an end 170 of the handlebar 104.

The master cylinder 152 includes a first chamber 172 (e.g., a fluid reservoir chamber) and a second chamber 174 (e.g., an air chamber) that opposes the first chamber 172. The second chamber 174 is open to the atmosphere contained within a first portion 176 (e.g., a first cylindrical portion) of the master cylinder 152. The first cylindrical portion 176 of the master cylinder 152 includes the first chamber 172 and the second chamber 174.

The first chamber 172 and the second chamber 174 are separated by a barrier 178. The barrier 178 is, for example, a bladder and is made of a flexible material. The flexible bladder may be made of any number of materials including, for example, rubber.

The master cylinder 152 also includes a second portion 180 (e.g., a second cylindrical portion). The piston 162 is configured to translate within the second cylindrical portion 180 of the master cylinder 152. In other words, the piston 162 is configured to move axially within the second cylindrical portion 180 of the master cylinder 152. In the example shown in FIGS. 2-4, the piston 162 is also configured to translate and move axially within the first cylindrical portion 176 of the master cylinder 152.

The master cylinder 152 includes a spring 182 (e.g., a return spring) disposed within the second cylindrical portion 180 of the master cylinder 152. The return spring 182 may be any number of different types of springs (e.g., a compression spring) and may be made of any number of different materials (e.g., a metal). The return spring 182 acts against the piston 162 to hold the piston 162 in an initial position (e.g., a first position).

The master cylinder 152 also includes a closure mechanism 184 (e.g., a hydraulic closure mechanism) disposed on the piston 162 within the second cylindrical portion 180 of the master cylinder 152. For example, the closure mechanism 184 is disposed on the piston 162 adjacent to a first end 186 of the piston 162, and the return spring 182 acts on the piston 162 adjacent to the first end 186 of the piston 162. Fluid communication between the first chamber 172 within the first cylindrical portion 176 of the master cylinder 152 and the second cylindrical portion 180 may be interrupted with the closure mechanism 184.

The closure mechanism 184 is disposed within the handlebar 104 when the master cylinder assembly 150 is attached to the handlebar 104. Accordingly, the second cylindrical portion 180 of the master cylinder 152 is also disposed within the handlebar 104 when the master cylinder assembly 150 is attached to the handlebar 104.

A second end 188 of the piston 162, which is opposite the first end 186 of the piston 162, extends beyond the end 170 of the handlebar 104. Referring to FIG. 4, the second end 188 of the piston 162 is connected to the force applicator 154. The force applicator 154 may be, for example, a rod member. As shown in the example of FIG. 4, the master cylinder assembly 150 may include two rod members 154. The two rod members 154 may be opposite each other. In other embodiments, the master cylinder assembly 150 may include more or fewer force applicators 154 and/or may be positioned in any number of other ways relative to the handlebar 104 and/or each other.

The two rod members 154 extend axially along an outer surface 190 of the handlebar 104. At least a portion of each rod member of the two rod members 154, for example, is radially outer relative to the handlebar 104. For example, the portions of the two rod members 154 that extend axially along the outer surface 190 of the handlebar 104 are radially outer relative to the handlebar 104.

The two rod members 154, for example, are connected (e.g., pivotably connected) to the support 156. Referring to FIG. 3, The support 156 includes a first portion 192 and a second portion 194. The first portion 192 is, for example, a hoop that extends circumferentially around the handlebar 104, and the second portion 194 is, for example, a clamp body. The hoop 192 is pivotably connected to the clamp body 194 of the support 156. The hoop 192 may be pivotably connected to the clamp body 194 of the support 156 in any number of ways including, for example, with one or more connectors 195 (e.g., a captive pin extending through an opening in the clamp body 194).

The clamp body 194 has an inner annular surface. The inner annular surface of the clamp body 194 defines a clamp surface axis, which extends along the inner annular surface of the clamp body 194. The inner annular surface of the clamp body 194 also defines a clamp plane, which is a plane that extends through (e.g., intersects) the clamp body 194 and is perpendicular to the clamp surface axis. At least a portion of each rod member of the two rod members 154, for example, is radially outer relative to the clamp surface axis. For example, the portions of the two rod members 154 that extend axially along the outer surface 190 of the handlebar 104 are radially outer relative to the clamp surface axis.

In one embodiment, the two rod members 154 are pivotably connected to the hoop 192 on opposite sides of the hoop 192 (e.g., such that the two rod members 154 are opposite each other). Other positioning of the two rod members 154 relative to the hoop 192 may be provided.

The two rod members 154 are pivotably connected to the hoop 192 in any number of different ways. For example, as discussed in more detail below, each of the two rod members 154 may include an eyelet, and a corresponding connector (e.g., a pin with a headed end) may be inserted through the eyelet of the respective rod member 154 and into a corresponding hole in the hoop 192 of the support 156 to physically connect the two rod members 154 to the hoop 192 of the support 156.

Opposite the connection of the hoop 192 to the clamp body 194 of the support 156, the hoop 192 supports a roller 196 via, for example, a pivotable connection 197. The actuator 158 includes a cam 198 that is pivotally connected to the clamp body 194 of the support 156. The cam 198 has a cam surface 200 that abuts the roller 196. The cam 198 also has a socket surface 202 (e.g., forming a cam socket).

The actuator 158 also includes, for example, a blade 204 (e.g., a lever) that is pivotally connected to the clamp body 194 of the support 156. An end 205 of the blade 204 (e.g., an end of the actuator 158) and the master cylinder 152 are on a same side of the clamp plane defined by the clamp body 194.

The blade 204 includes a dowel 206 that is pivotally connected within the blade 204. A screw 208 is, for example, threadably connected to the dowel 206. In one embodiment, a knob 210 is fixed to one end of the screw 208, such that the knob 210 and the screw 208 rotate together, which allows the screw 208 to be rotated by hand. At or adjacent an end of the screw 208 opposite the knob 210, the screw 208 has, for example, a ball end 212 that is biased against the socket surface 202 of the cam 198. A biasing spring 214 acts between the blade 204 and components of the clamp body 194, so as to hold the blade 204 and the components of the clamp body 194 against each other.

FIGS. 2-4 illustrate the initial state of the assembly before brake application occurs. A hand of the user applies load to a hook portion 216 of the blade 204. A resulting load causes the blade 204 to rotate about the pivotal connection with the clamp body 194 of the support 156. Load is transferred through the dowel 206 fitted within the blade 204, through the screw 208, and onto the socket surface 202 (e.g., into the cam socket). Load on the cam surface 202 transfers through the cam 198 normal to the cam surface 200 and into the roller 196. Load from the roller 196 causes rotation of the hoop 192 about the pivotal connection with the clamp body 194 of the support 156.

The rotation of the hoop 192 simultaneously pulls the two rod members 154 axially relative to the handlebar 104. Thus, during brake application by the user (e.g., actuation), the two rod members 154 are under tensile load. The rod movement causes the piston 162 to translate into the second cylindrical portion 180 of the master cylinder 152.

After an initial amount of translation of the piston 162 within the master cylinder 152, the closure mechanism 184 (e.g., hydraulic closure mechanism) closes, causing fluid housed within the second cylindrical portion 180 of the master cylinder 152 to move through a hose 218 to a brake caliper (e.g., of a hydraulic actuation system).

Referring to FIG. 4, a grip 220 covers a portion of the master cylinder 152, including portions of the two rod members 154, respectively, and a portion of the handlebar 104. For example, the two rod members 154 extend axially along the outer surface 190 of the handlebar 104 and within one or more channels 224 disposed within an inner surface 226 of the grip 220. The two rod members 154 extend beyond an end 228 of the grip 220 (e.g., the end of the grip 220 furthest from the second portion 168 of the housing 160 of the master cylinder 152 when the master cylinder 152 is installed in the handlebar 104). The grip 220 fits over an outer surface 230 of the second portion 168 of the housing 160 of the master cylinder 152 and the handlebar 104.

Referring to FIG. 3, the grip 220 includes a rib feature 232 that extends away from the inner surface 226 of the grip 220 and axially along the length of the grip 220. The rib feature 232 of the grip 220 corresponds with and registers into a slot that extends axially along the master cylinder 152. The disposal of the rib feature 232 of the grip 220 within the slot within the master cylinder 152 prevents rotation of the grip 220 and the master cylinder 152 relative to each other in an installed state.

The grip 220 may be attached to the master cylinder 152 in additional and/or different ways. For example, the grip 220 may also be fastened to the master cylinder 152 with one or more connectors. Referring to FIGS. 2 and 3, the grip 220 may be fastened to the master cylinder 152 with a threaded bolt connection 234 (e.g. including a bolt 235), such that the grip 220 and the master cylinder 152 are fixed together in the axial direction of the handlebar 104. For example, the grip 220 and the master cylinder 152 (e.g., the housing 160 of the master cylinder 152) each include openings as part of the threaded bolt connection 234. In other words, the bolt 235 of the threaded bolt connection 234 extends through and connects the grip 220 to the master cylinder 152 via the openings through the grip 220 and the master cylinder 152.

Referring to FIG. 3, the end 228 of the grip 220 fits within the clamp body 194 of the support 156, to limit or prevent rotation between the grip 220, and the clamp body 194 and the handlebar 104. In other words, the clamp body 194 of the support 156 secures the grip 220 to the outer surface 190 of the handlebar 104. The clamp body 194 of the support 156 may secure the grip 220 to the outer surface 190 of the handlebar 104 in any number of ways including, for example, with one or more connectors 240 (e.g., a clamping bolt). The grip 220 may be attached to the master cylinder 152 and/or the handlebar 104 in additional, fewer, and/or different ways.

Figure 5:
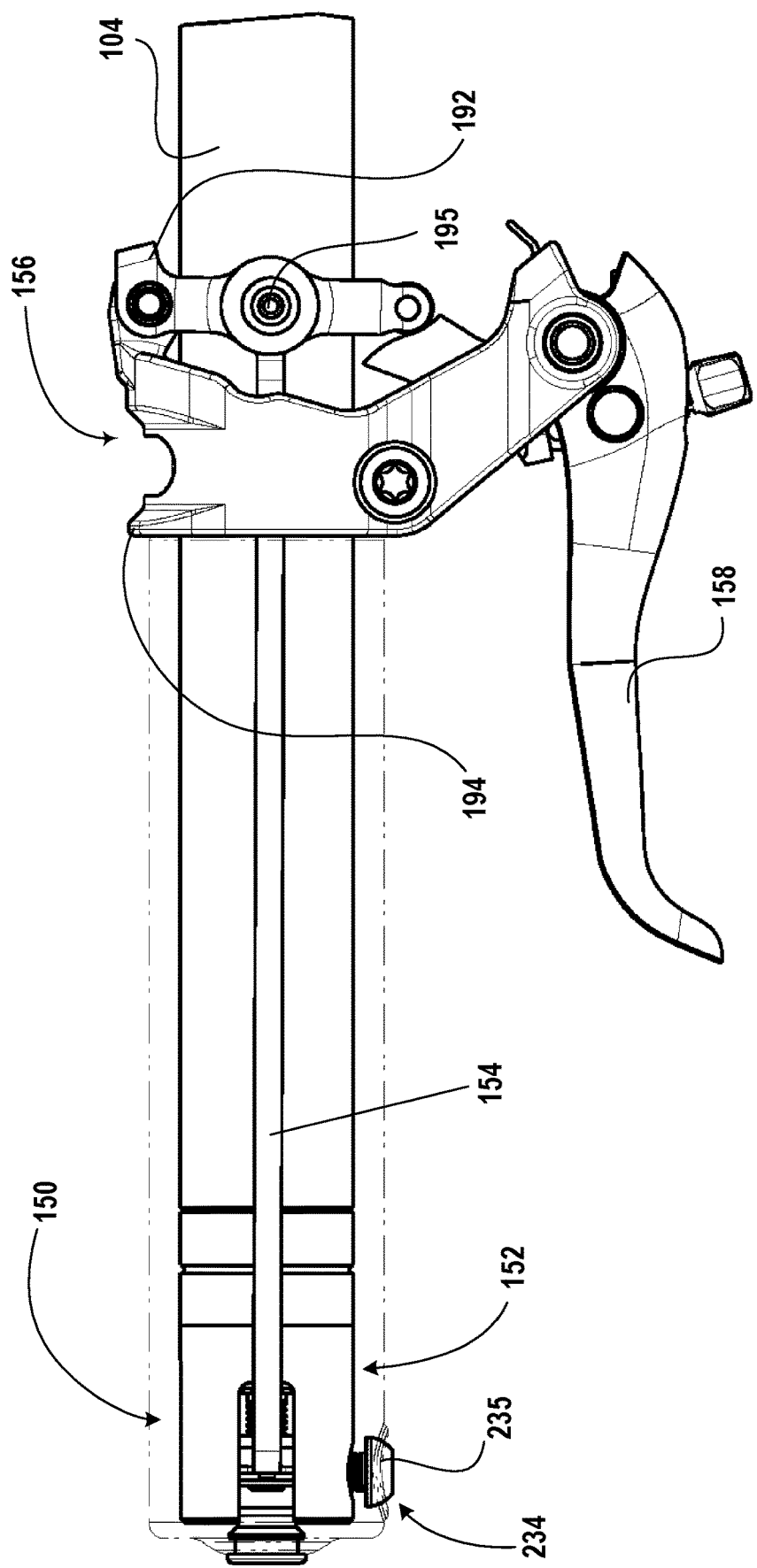
FIG. 5 is a side view of the handlebar integrated master cylinder assembly of FIG. 2, with a lever actuated.
Figure 6:
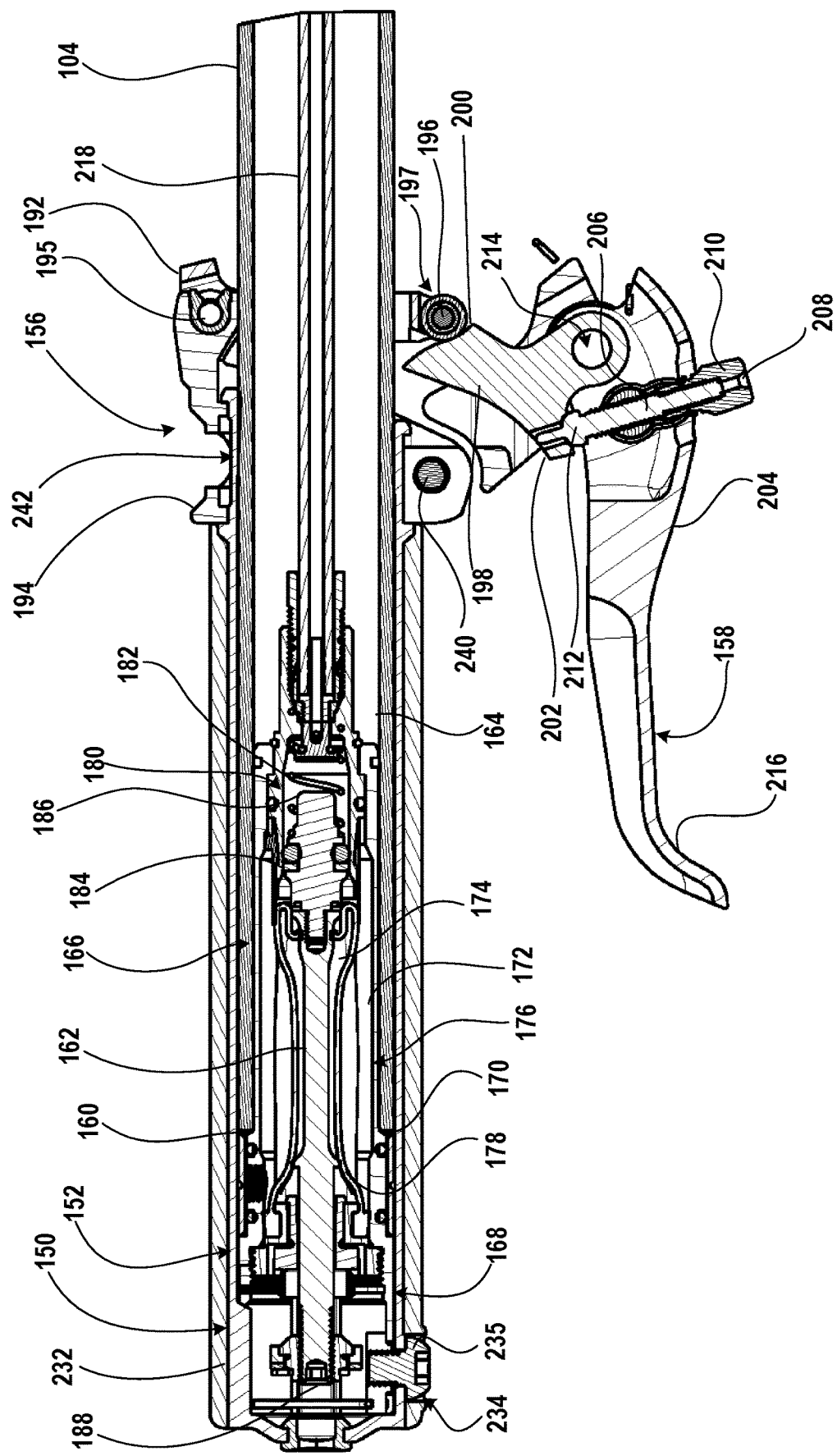
FIG. 6 is a side cross-sectional view of the handlebar integrated master cylinder assembly of FIG. 5 covered by a grip.
Figure 7:
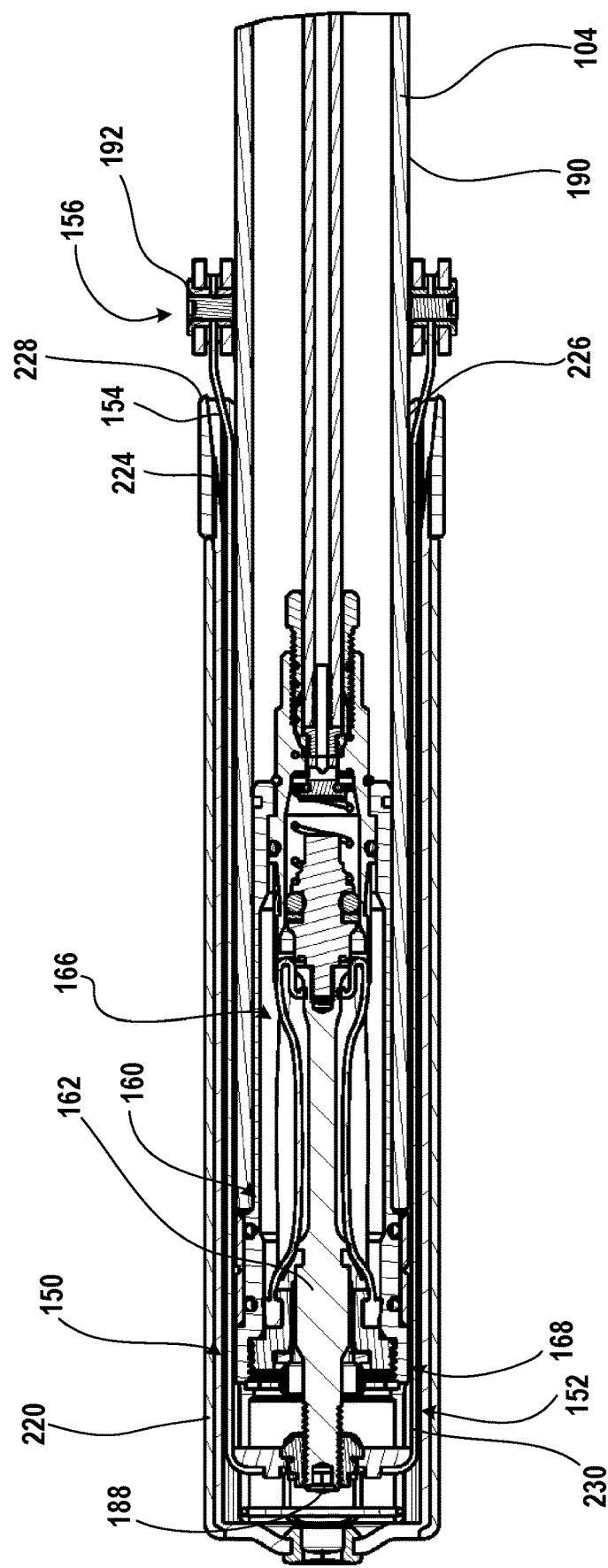
FIG. 7 is a top cross-sectional view of the handlebar integrated master cylinder assembly of FIG. 5 covered by a grip.

FIGS. 5-7 illustrate the master cylinder assembly 150 after the hydraulic closure mechanism 184 has been engaged and pressure is building within the second cylindrical portion 180 of the master cylinder 152. The resulting load due to this pressure is transferred through the components, as described above. Additionally, a reactive load from the pivotal connection between the hoop 192 and the clamp body 194 of the support 156 acts to push the clamp body 194 axially on the handlebar 104. This load is transferred through the clamp body 194 of the support 156 into the grip 220. From the grip 220, the load is transferred partially through a frictional interface 242 between the grip 220 and the handlebar 104, and partially through the threaded bolt connection 234 to the master cylinder 152. Without the bolt 235, the load would be solely resisted by the frictional interface 242 between the grip 220 and the handlebar 104, which, in most cases, is insufficient to prevent the grip 220 from sliding off the handlebar 104 under heavier applied loads to the blade 204.

Figure 8:
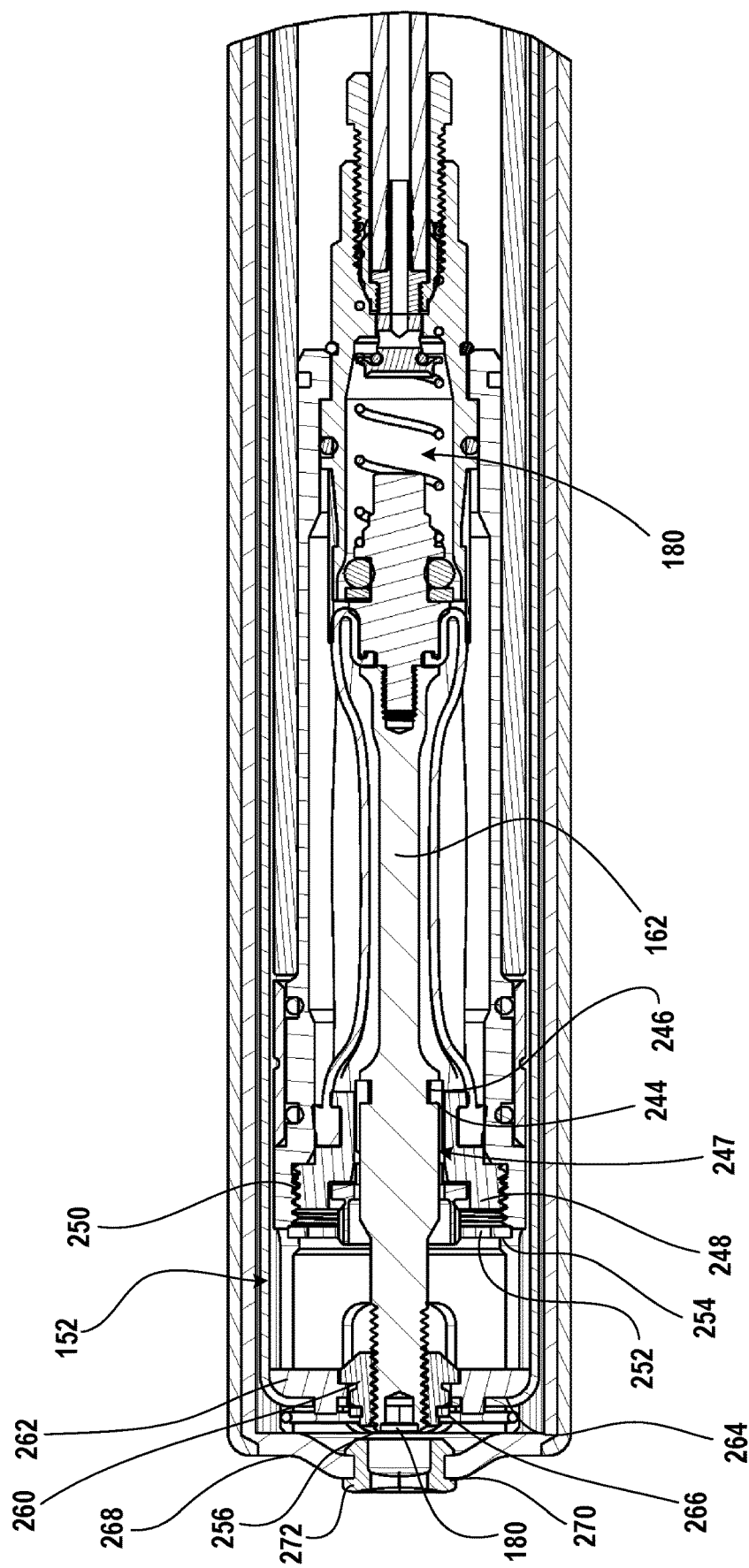
FIG. 8 is a close-up side cross-sectional view of the handlebar integrated master cylinder assembly of FIG. 2 covered by a grip, illustrating a short dead-stroke.
Figure 9:
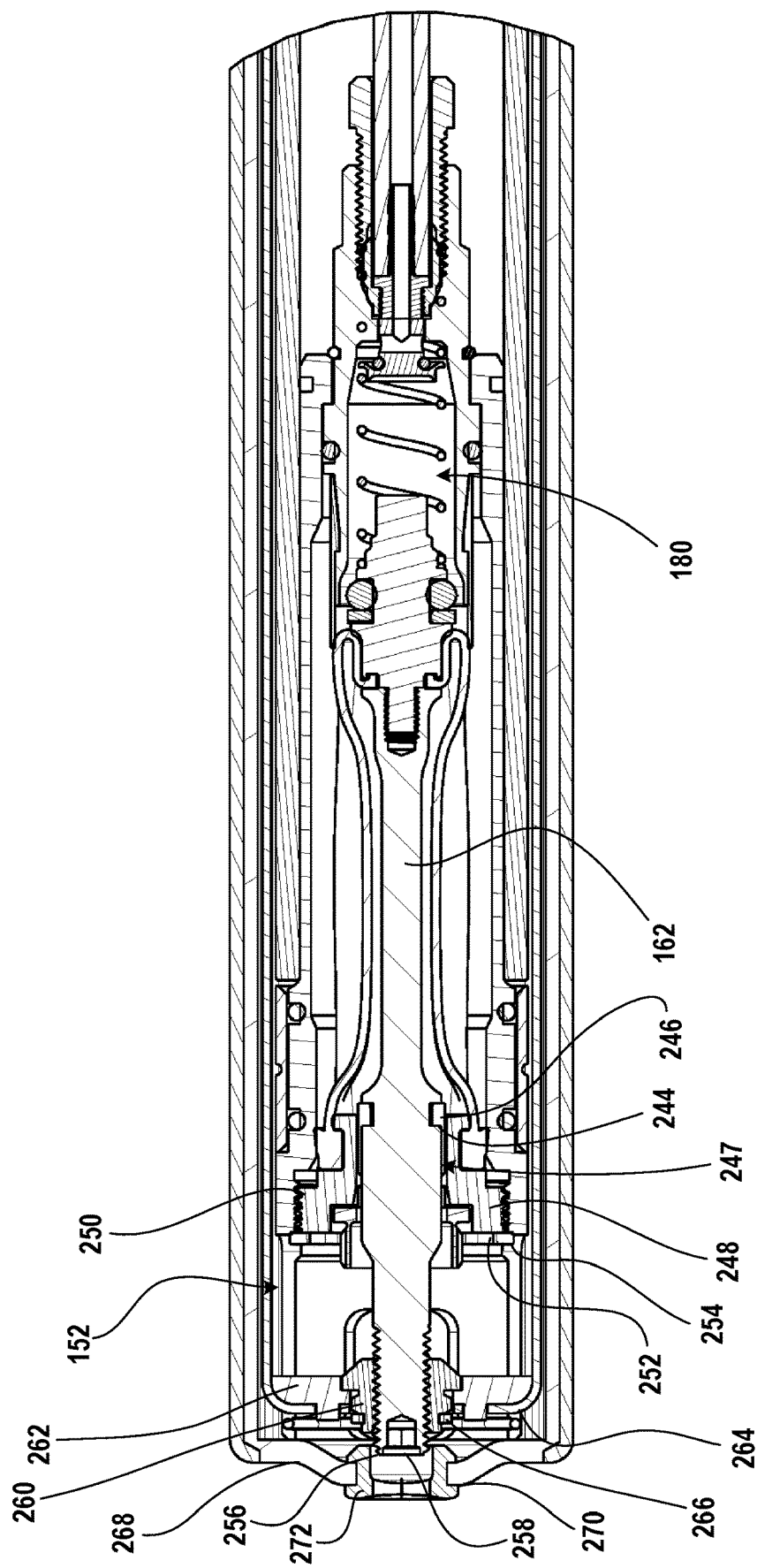
FIG. 9 is a close-up side cross-sectional view of the handlebar integrated master cylinder assembly of FIG. 2 covered by a grip, illustrating a long dead-stroke.

FIGS. 8 and 9 illustrate an exemplary method for adjustment of an initial position of the piston 162 relative to the second cylindrical portion 180 of the master cylinder 152. A distance between the initial position of the piston 162 and the second cylindrical portion 180 of the master cylinder 152 may be referred to as, for example, a dead-stroke.

The piston 162 has a shelf 244 that is mated against a sleeve 246. Features 247 (e.g., clocking features) between the piston 162 and the sleeve 246 prevent the piston 162 and the sleeve 246 from rotating relative to each other. The sleeve 246 is captured within a retainer 248 (e.g., a first retainer). In one embodiment, the sleeve 246 and the first retainer 248 are also clocked to prevent rotation between the sleeve 246 and the first retainer 248.

The first retainer 248 is connected to an inner surface 250 of the master cylinder 152. A retention ring 252 is placed into a groove 254 inside the master cylinder 152 to provide a stop to prevent the first retainer 248 from exiting the master cylinder 152 (e.g., fully unthreading from the master cylinder 152). An end 256 of the piston 162 includes a tool interface 258 to allow the user to rotate the piston 162. The end 256 of the piston 162 is also connected (e.g., threadably connected) to another retainer 260 (e.g., a second retainer). A thread pitch of the second retainer 260 matches a thread pitch of the first retainer 248. One or more of these components form an adjuster (e.g., at least the end 256 of the piston 162 including the tool interface 258 combined with the threaded connections).

The second retainer 260 holds a brace 262, a rod member cross-piece 264, and a retention clip 266. The second retainer 260, the brace 262, the rod member cross-piece 264, and the retention clip 266, for example, are all clocked together to prevent rotation therebetween. The rod member cross-piece 264 extends through the one or more channels 224 disposed within the inner surface 226 of the grip 220.

With a tool inserted into the end 256 of the piston 162, rotation of the tool causes the piston 162, the sleeve 246, and the first retainer 248 to rotate together, working to unthread the first retainer 248 from the master cylinder 152. At the same time, the piston 162 rotates through the second retainer 260. The matched thread pitches allow a position of the piston 162 relative to the second cylindrical portion 180 of the master cylinder 152 to increase, while a position of a yoke relative to the second cylindrical portion 180 of the master cylinder 152 remains unchanged.

FIG. 8 illustrates the master cylinder assembly 150 with a dead-stroke at a shortest allowable length. FIG. 9 illustrates the master cylinder assembly 150 with a dead-stroke at a largest allowable length. As the initial position of the piston 162 relative to the second cylindrical portion 180 is increased, a resulting translation of the piston 162 required to engage the hydraulic closure mechanism 184 also increases. This results in a larger amount of rotation of the blade 204 required to close the hydraulic system, thereby moving a contact point of the blade 204 closer to the handlebar 104.

An end 268 of the grip 220 includes an opening 270 through which a user may insert the tool to engage with the end 256 of the piston 162 for adjustment of the dead-stroke. In one embodiment, a cover or plug 272 may be placed into the opening 270 of the end 256 of the grip 220 to prevent ingress of water, debris, or other contaminants, for example.

Figure 10:
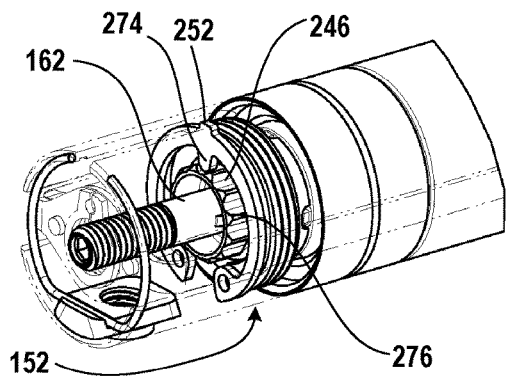
FIG. 10 is a close-up perspective view of the handlebar integrated master cylinder assembly of FIG. 2, including a first embodiment of a device for fixing a rotational position of a piston of the master cylinder assembly.
Figure 11:
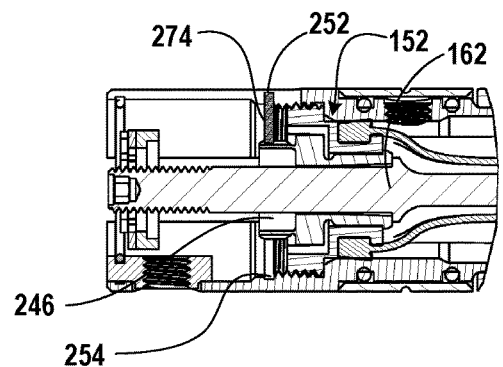
FIG. 11 is a close-up side cross-sectional view of the handlebar integrated master cylinder assembly of FIG. 10.

FIGS. 10-13 illustrate different ways for securing the rotational adjustment of the piston 162 or, in other words, different ways to prevent unwanted change of the dead-stroke length. FIGS. 10 and 11 illustrate an arrangement in which a protrusion 274 extends radially from the retention ring 252 placed in the groove 254 in the master cylinder 152. For example, the protrusion 274 extends radially away from the retention ring 252 and towards the piston 162. The protrusion 274 registers with features 276 (e.g., lobe features) on the sleeve 246. In the embodiment shown in FIGS. 10 and 11, the features 276 are patterned around the sleeve 246. In other embodiments, the lobe features 276 may be shaped and/or sized differently, and/or may be patterned around less than all of the sleeve 246. As the piston 162 is rotated by the user, the lobe features 276 of the sleeve 246 deflect and ride over an end of the protrusion 274 of the retention ring 252. Otherwise, the interaction between the lobe features 276 of the sleeve 246 and the protrusion 274 of the retention ring 252 prevents relative rotational movement between the piston 162 and the housing 160 of the master cylinder 152.

Figure 12:
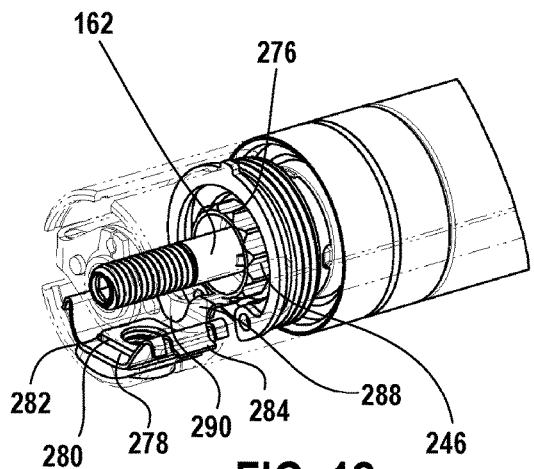
FIG. 12 is a close-up perspective view of the handlebar integrated master cylinder assembly of FIG. 2, including a second embodiment of a device for fixing a rotational position of a piston of the master cylinder assembly.
Figure 13:
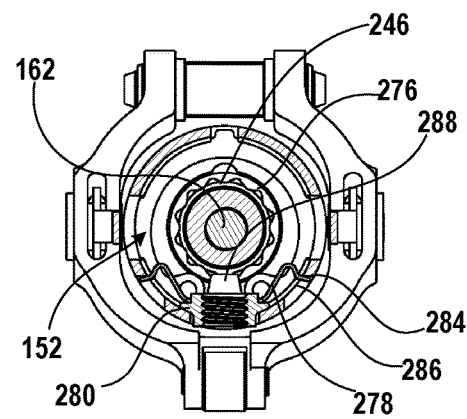
FIG. 13 is a close-up side cross-sectional view of the handlebar integrated master cylinder assembly of FIG. 12.
Figure 14:
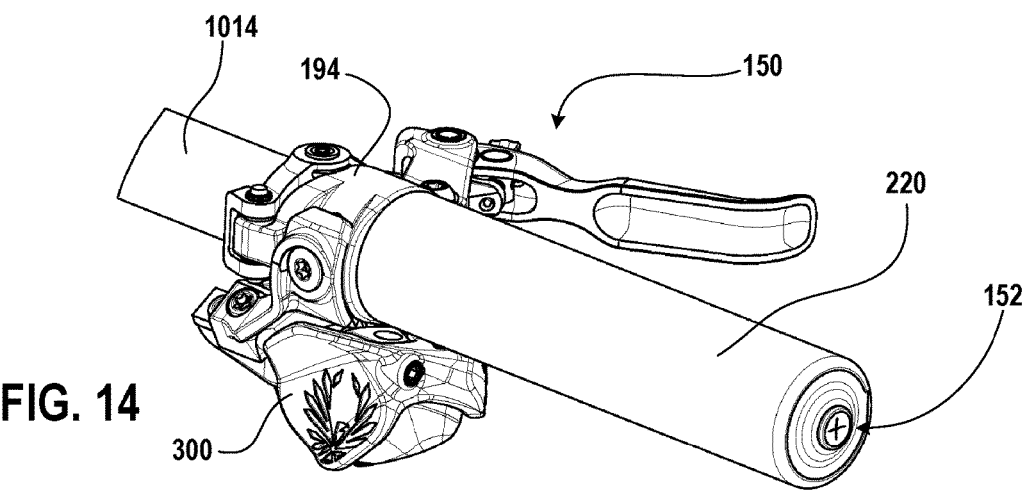
FIG. 14 is a close-up perspective view of the handlebar integrated master cylinder assembly of FIG. 2 covered by a grip, including an accessory component attached to the master cylinder assembly.

FIGS. 12 and 13 illustrate an alternative arrangement, in which the sleeve 246 again includes the features 276 patterned around the sleeve 246. A clip component 278 (e.g., a detent clip component) connects to a nut component 280. In the embodiment shown in FIGS. 12 and 13, the nut component 280 includes anti-rotation features 282 (e.g., one or more flanges) that prevent rotation between the nut component 280 and the clip component 278. Ends 284 of the clip component 278 engage into reliefs 286 within the master cylinder 152. An extension 288 (e.g., a finger) extends away from a side 290 of the clip component 278 and registers against the features 276 of the sleeve 246. As the piston 162 is rotated by the user, the features 276 of the sleeve 246 deflect the finger 288 of the clip component 278. In another embodiment, the finger 288 of the clip component 278 deflects the features 276 of the sleeve 246 as the piston 162 is rotated. Without rotation of the piston 162 by the user, the interaction between the lobe features 276 of the sleeve 246 and the finger 288 of the clip component 278 prevents relative rotational movement between the piston 162 and the housing 160 of the master cylinder 152.

FIGS. 14-17 illustrate exemplary structure for attaching an accessory component 300 to the master cylinder assembly 150 (e.g., the clamp body 194) of the present disclosure. In this example, the accessory component 300 is a wireless electronic controller unit for shifting of gears on the bicycle 100. In other embodiments, different accessory components 300 may be attached to the master cylinder assembly 150 using the same structure.

Figure 15:
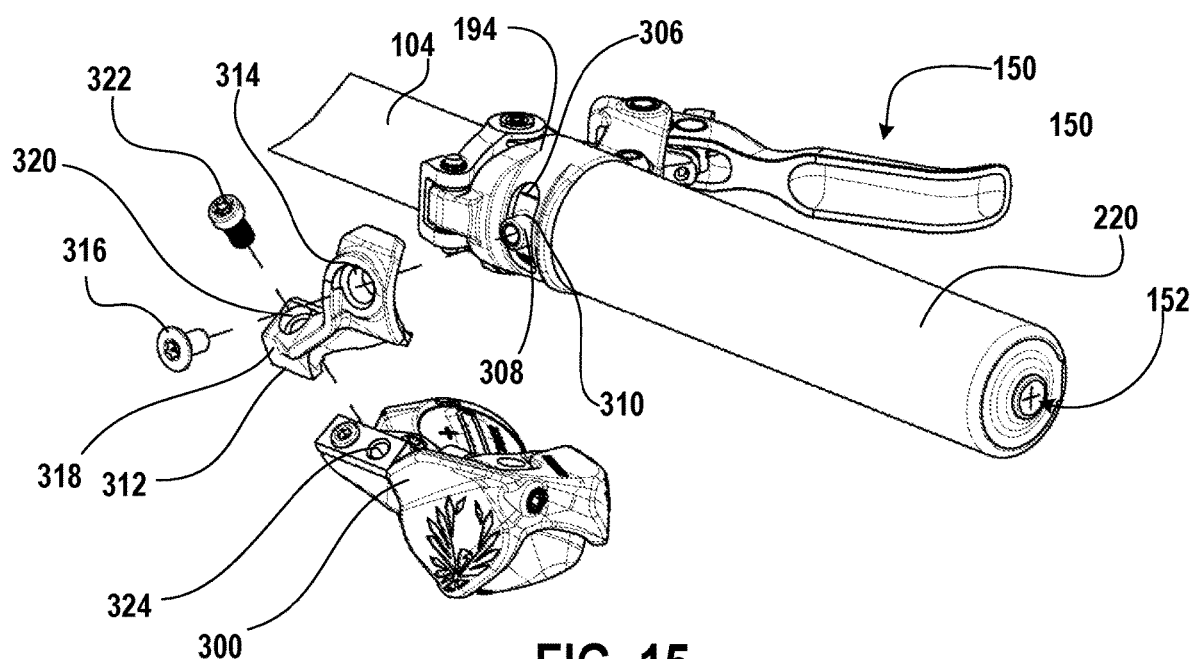
FIG. 15 is an exploded perspective view of the handlebar integrated master cylinder assembly of FIG. 14.
Figure 16:
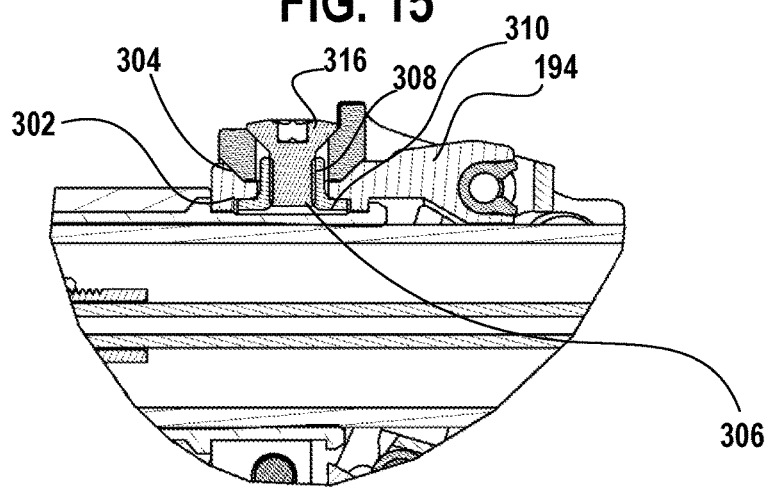
FIG. 16 is a close-up side cross-sectional view of the handlebar integrated master cylinder assembly of FIG. 14.
Figure 17:
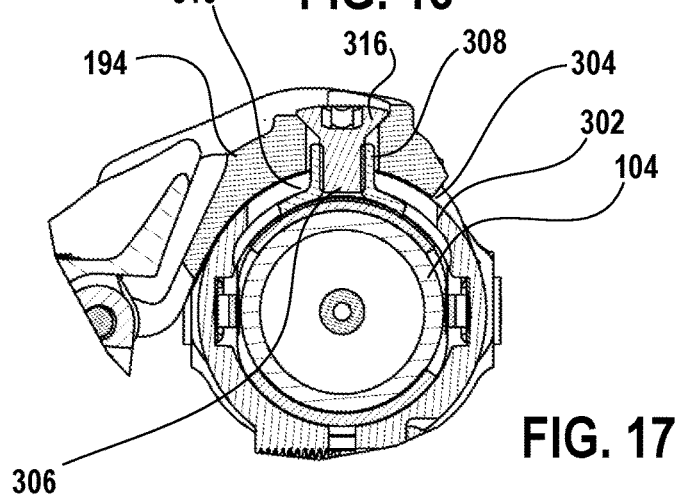
FIG. 17 is a close-up side cross-sectional view of the handlebar integrated master cylinder assembly of FIG. 14.

Referring to FIGS. 15-17, the clamp body 194 includes one or more inner reliefs 302 (e.g., inner reliefs) and one or more outer reliefs 304 (e.g., outer reliefs). An opening 306 extends between the inner reliefs 302 and the outer reliefs 304. A portion of a nut 308 (e.g., a threaded portion of an accessory nut) extends through the opening 306 between the inner reliefs 302 and the outer reliefs 304. The nut 308 has a flanged end 310 that mates with surfaces of the clamp body 194 that form the inner reliefs 302.

The structure for attaching the accessory component 300 to the master cylinder assembly 150 (e.g., the clamp body 194) includes a knuckle 312 that corresponds with (e.g., mates with) the outer reliefs 304. The knuckle 312 includes a hole 314, through which the nut 308 (e.g., the threaded portion of the nut 308) extends when the accessory component 300 is to be attached to the master cylinder assembly 150. A bolt 316 (e.g., an accessory bolt) is threaded into the nut 308 and attaches the knuckle 312 to the clamp body 194, which prevents movement between the knuckle 312, and thus the accessory component 300, and the clamp body 194.

The inner reliefs 302 and the outer reliefs 304 extend circumferentially around a portion of the clamp body 194, which allows for a circumferential position of the bolt 316, the knuckle 312, and the nut 308 relative to the clamp body 194 to be changed.

The knuckle 312 includes an interface 318 for mounting the accessory component 300. The interface 318 includes, for example, an opening 320 through which a connector 322 (e.g., a threaded bolt) may extend for attachment of the accessory component 300 to the knuckle 312. The accessory component 300 may include an opening 324 (e.g., a threaded opening) that corresponds to the connector 322, and the accessory component 300 may be attached to the knuckle 312 with the connector 322 via the opening 320 through the knuckle 312 and the opening 324 through the accessory component 300.

Figure 18:
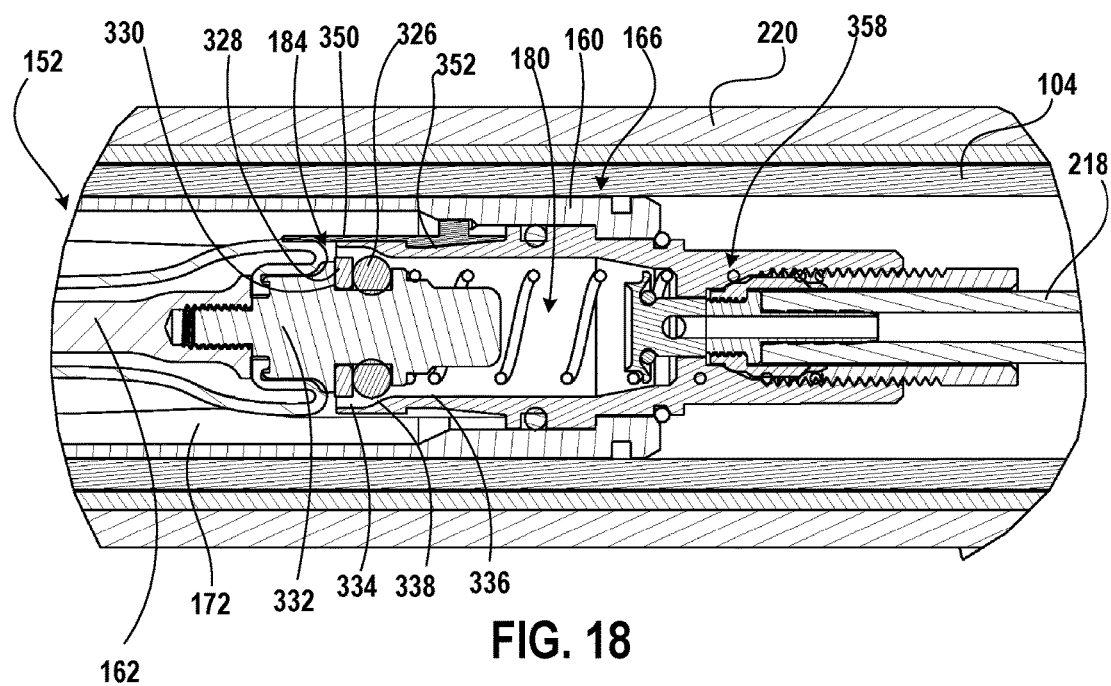
FIG. 18 is a close-up side cross-sectional view of the handlebar integrated master cylinder assembly of FIG. 2 covered by a grip, including a first embodiment of a hydraulic closure.
Figure 19:
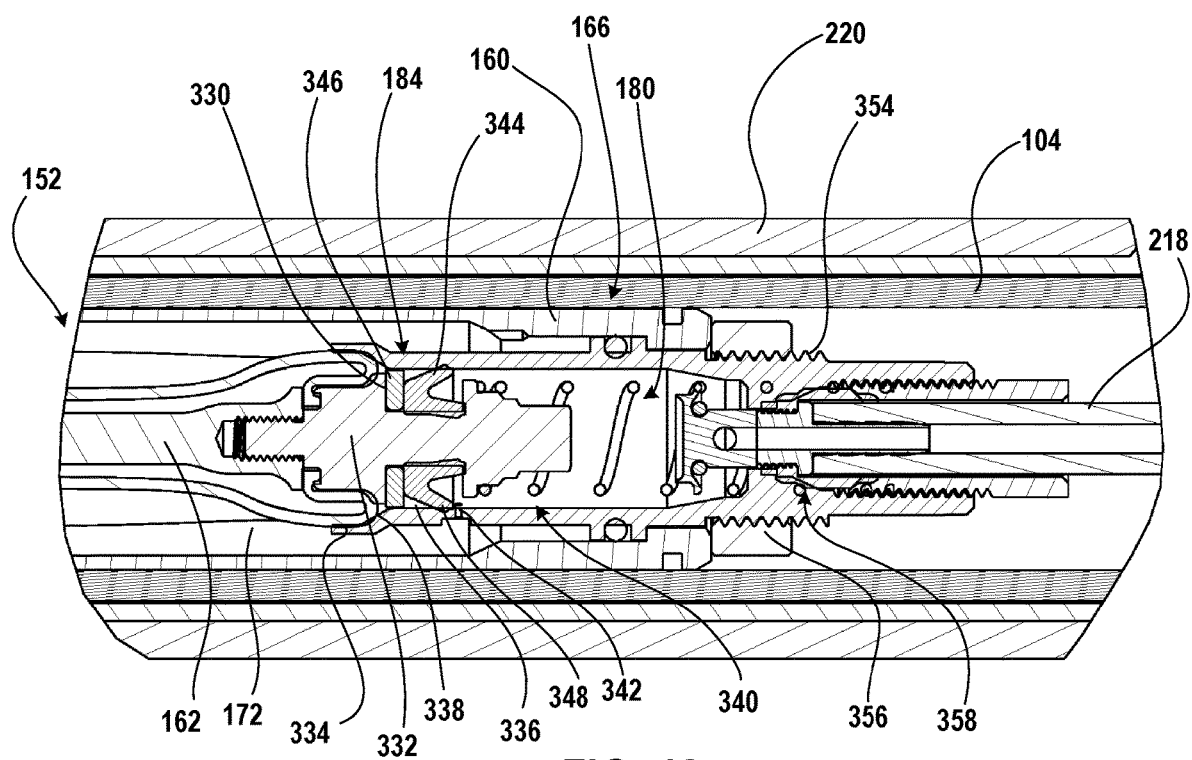
FIG. 19 is a close-up side cross-sectional view of the handlebar integrated master cylinder assembly of FIG. 2 covered by a grip, including a second embodiment of a hydraulic closure.

FIGS. 18 and 19 illustrate different examples of the hydraulic closure mechanism 184. In the first example shown in FIG. 18, a first seal 326 (e.g., an O-ring) and a second seal 328 (e.g., a split back-up ring) that acts as a backup seal are mounted in a groove 330 on a seal head 332. The seal head 332 is, for example, connected to the piston 162 with a threaded connection.

The second cylindrical portion 180 of the master cylinder 152 has a first part 334 and a second part 336. The first part 334 of the second cylindrical portion 180 has a larger diameter than the second part 336 of the second cylindrical portion 180. The second cylindrical portion 180 also includes a third part 338 (e.g., a tapered part). The third part 338 of the second cylindrical portion 180 is disposed between the first part 334 and the second part 336 of the second cylindrical portion 180 and is tapered between the first part 334 and the second part 336. Translation of the piston 162 causes the O-ring 326, for example, to contact the tapered part 338 of the second cylindrical portion 180 of the master cylinder 152 and compress into the second part 336 of the second cylindrical portion 180, thereby closing the hydraulic system and activating the brake caliper of the hydraulic actuation system.

In the second example shown in FIG. 19, one or more walls 340 that at least partially form the second cylindrical portion 180 (e.g., the second part 336 of the second cylindrical portion 180) include one or more cross holes 342 (e.g., a cross hole) extending therethrough. A first seal 344 (e.g., with a u-shaped cross section) and a second seal 346 (e.g., a split back-up ring) that acts as a backup seal are mounted in the groove 330 on the seal head 332. Translation of the piston 162 causes an outer lip 348 of the seal first seal 344 to slide across the cross hole 342, thereby closing the hydraulic system and activating the brake caliper of the hydraulic actuation system.

FIGS. 18 and 19 also illustrate different ways for mitigating the effect of air bubbles inside the fluid reservoir 172. Air bubbles are compressible, and when air bubbles are disposed inside the second cylindrical portion 180 of the master cylinder 152, the air bubbles may result in additional translation of the piston 162 being required to generate a desired amount of fluid pressure. Therefore, it is desirable to keep the air bubbles retained within the fluid reservoir 172.

FIG. 18 shows a first example in which a clip 350 (e.g., a u-shaped clip) that is disposed on one or more outer surfaces 352 of the second cylindrical portion 180 of the master cylinder 152. The second cylindrical portion 180 is rotatable relative to the clip 350, but the clip 350 is clocked to the first portion 166 of the housing 160 of the master cylinder 152 to prevent rotation of the clip 350 relative to the first portion 166 of the housing 160 of the master cylinder 152. This provides that an open end of the u-shaped clip 350 remains at a low point of the fluid reservoir 172. The low point of the fluid reservoir 172 increases the difficulty for air bubbles to enter the second cylindrical portion 180 because the air bubbles resist buoyancy.

FIG. 19 shows a second example in which the second cylindrical portion 180 is rotatably fixed to the first portion 166 of the housing 160 of the master cylinder 152. An outer part 354 of the second cylindrical portion 180 is threadably connected to a nut 356 (e.g., a lock nut) that clamps the second cylindrical portion 180 to the first portion 166 of the housing 160 of the master cylinder 152. The second cylindrical portion 180 utilizes the cross hole 342 placed at the low point in the fluid reservoir 172. The low point again makes it more difficult for air bubbles to move into the second cylindrical portion 180.

FIGS. 18 and 19 also illustrate exemplary structure for connection and disconnection of the master cylinder 152 to the hose 218 (e.g., a hydraulic hose) without loss of brake fluid included within, for example, the hose 218. The exemplary structure includes a hose connection device 358. The hose connection device 358 acts as a quick connect valve to the hose 218. The hose connection device 358 is radially inner relative to the clamp surface axis defined by the clamp body 194. In other words, the hose connection device 358 is inside the handlebar 104. The hose connection device 358 and the master cylinder 152 are on a same side of the clamp plane defined by the clamp body 194.

A more detailed description of an exemplary hose connection device that may be incorporated within the master cylinder assembly 150 of the present disclosure is found in U.S. Patent Application Publication No. 2016/0200392, which is hereby incorporated by reference in its entirety. The hose connection device 358 allows for connection of the hose 218 to the master cylinder 152 without requiring re-bleeding of the system.

Figure 20:
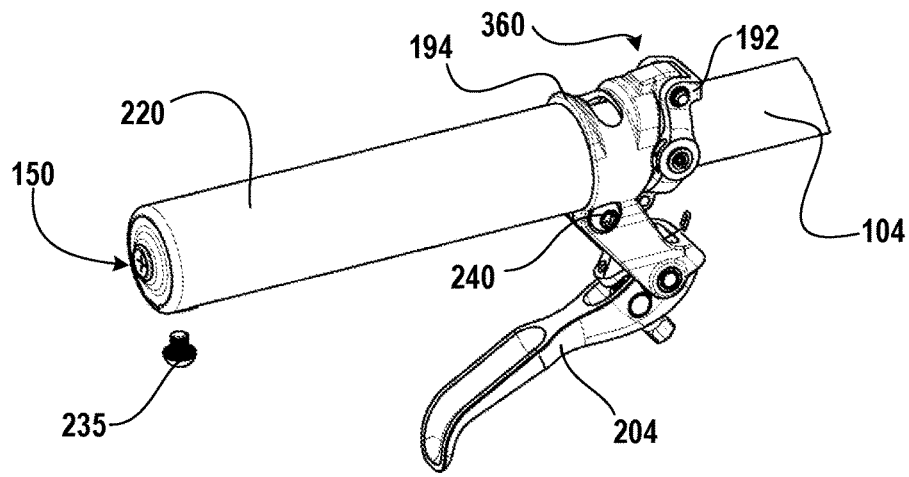
FIG. 20 is a perspective view of the handlebar integrated master cylinder assembly of FIG. 2 covered by a grip, illustrating a first step of a bleeding process.

FIGS. 20-23 illustrate an exemplary method for filling the master cylinder assembly 150 with a brake fluid and/or for extracting air contained within the master cylinder assembly 150. A caliper assembly (e.g., including the brake caliper) includes a bleed fitting by which a bleeding tool may be connected. Referring to FIG. 20, the clamping bolt 240 on the clamp body 194 is loosened such that the master cylinder assembly 150 is free to rotate relative to the handlebar 104. The bolt 235 connecting the grip 220 and the master cylinder 152 is then loosened and removed. The user may then hold onto the hoop 192 with one hand, while simultaneously pulling axially on the grip 220. The grip 220 and other components attached to the grip 220 (e.g., the clamp body 194 and the blade 204) slide off the handlebar 104.

Figure 21:
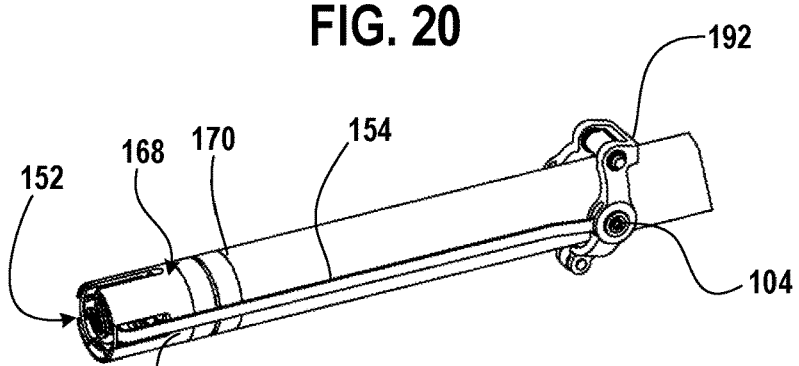
FIG. 21 is a perspective view of the handlebar integrated master cylinder assembly of FIG. 2, illustrating a second step of the bleeding process.

FIG. 21 illustrates the result of the grip 220 and the other components attached to the grip 220 (e.g., the clamp body 194 and the blade 204) being removed from the handlebar 104, with the master cylinder 152 and the two rod members 154 still installed on and/or within the handlebar 104. FIG. 21 shows a portion of the master cylinder 152 (e.g., the second portion 168 of the housing 160 of the master cylinder 152) and the two rod members 154 exposed after the grip 220 has been removed. A pivotal connection 360 between the hoop 192 and clamp body 194 may include a slotted feature in the clamp body 194, which allows the hoop 192 to disengage from the clamp body 194 when the grip 220 is pulled axially off the handlebar 104.

Figure 22:
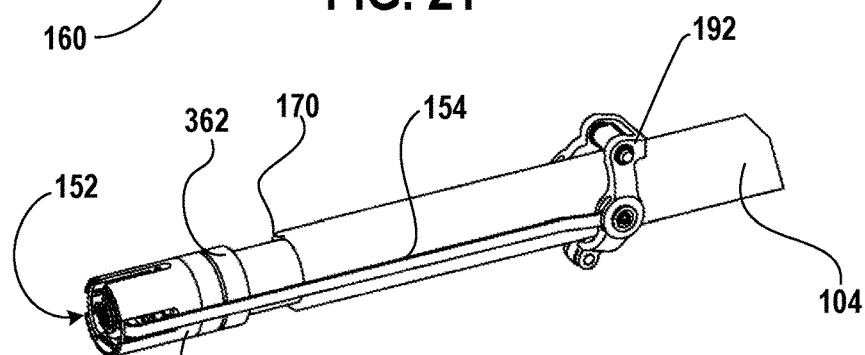
FIG. 22 is a perspective view of the handlebar integrated master cylinder assembly of FIG. 2, illustrating a third step of the bleeding process.

Referring to FIG. 22, the user next applies axial load on the master cylinder 152 to slide the master cylinder 152 away from the end 170 of the handlebar 104, thus, sliding the first portion of the master cylinder 152 at least partially out of the handlebar 104. The user then uses one hand to hold the master cylinder 152, while using the other hand to slide (e.g., translate) a sleeve 362 (e.g., a bleed sleeve) of the master cylinder 152 towards the end 170 of the handlebar 104.

Figure 23:
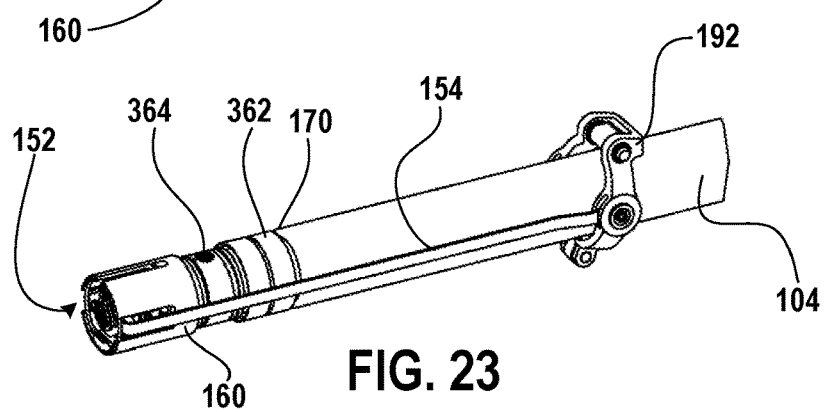
FIG. 23 is a perspective view of the handlebar integrated master cylinder assembly of FIG. 2, illustrating a fourth step of the bleeding process.

Referring to FIG. 23, the translation of the bleed sleeve 362 towards the end 170 of the handlebar 104 disengages one or more seals (e.g., two circumferential seals) disposed in grooves in a portion of the master cylinder 152 (e.g., the second portion of the master cylinder 152) from the bleed sleeve 362, thereby opening the fluid reservoir 172 to the external environment. A bleeding tool is then connected (e.g., threadably) to a port 364, which is exposed after the translation of the bleed sleeve 362 towards the end 170 of the handlebar 104. The port 364 is, for example, a bleed port and extends through an annular surface of the master cylinder 152 (e.g., the second portion of the master cylinder 152). The bleed tool is then able to allow fluid flow through the hydraulic system to extract air and fill the hydraulic system with the brake fluid.

Figure 24:
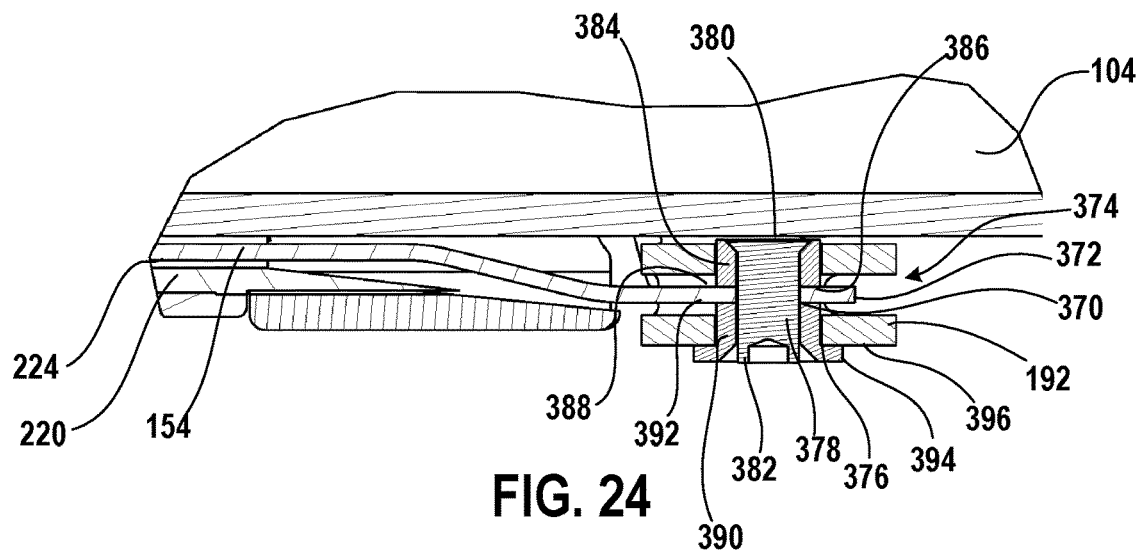
FIG. 24 is a close-up top cross-sectional view of the handlebar integrated master cylinder assembly of FIG. 2 covered by a grip, illustrating a first embodiment of a force applicator.
Figure 25:
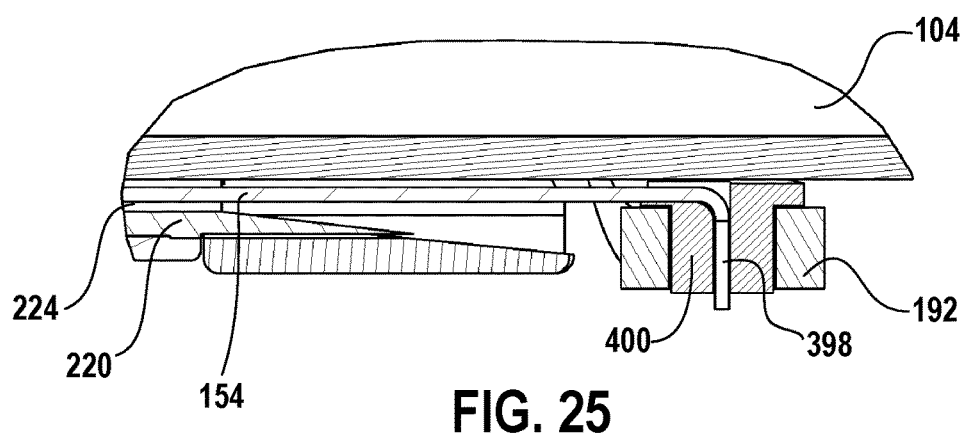
FIG. 25 is a close-up top cross-sectional view of the handlebar integrated master cylinder assembly of FIG. 2 covered by a grip, illustrating a second embodiment of a force applicator.
Figure 26:
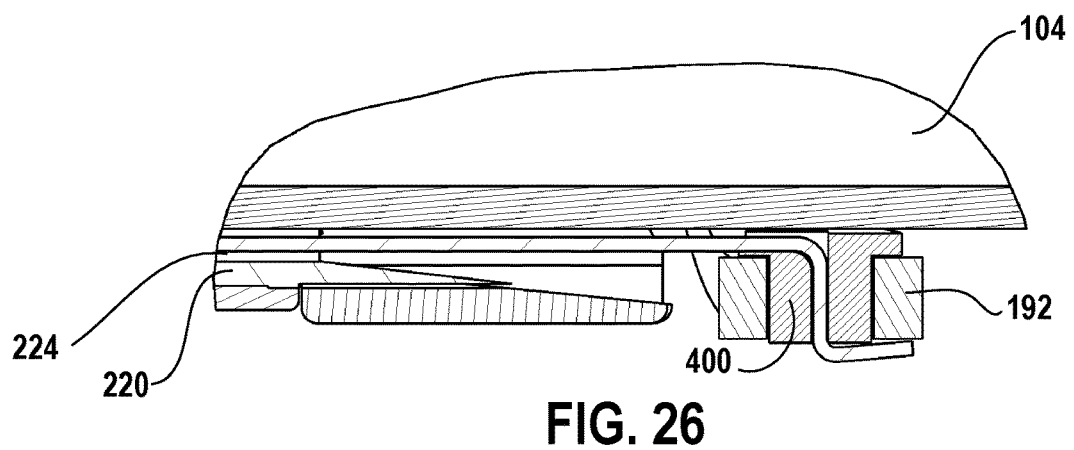
FIG. 26 is a close-up top cross-sectional view of the handlebar integrated master cylinder assembly of FIG. 2 covered by a grip, illustrating a third embodiment of a force applicator.

FIGS. 24-26 illustrate different exemplary ways to pivotably connect the hoop 192 and the two rod members 154. It may be desirable to limit an outer diameter of the grip 220 in order to accommodate users with smaller sized hands. Therefore, the two rod members 154 and the channels 224 through which the two rod members 154 extend may be kept as low profile as possible. This presents challenges for the pivotal connection of the two rod members 154 to the hoop 192.

FIG. 24 illustrates one embodiment of the rod member 154, which includes an eyelet 370 adjacent to an end 372 of the rod member 154. The eyelet 370 is placed into an opening 374 (e.g., a slotted opening) within the hoop 192. The hoop 192 also includes a cross hole 376. The cross hole 376 extends in a direction that is, for example, perpendicular to a direction in which the slotted opening 374 extends.

A pin 378 is inserted into the cross hole 376 of the hoop 192 and extends through the cross hole 376 of the hoop 192 and the eyelet 370 of the rod member 154. The pin 378 includes a first end 380 (e.g., a headed end) and a second end 382 (e.g., a non-headed end). A first bushing 384 slides over the pin 378, is disposed within the cross hole 376 of the hoop 192, and abuts the headed end 380. An end 386 of the first bushing 384 that is opposite the headed end 380 of the pin 378 abuts a first surface 388 of the eyelet 370 of the rod member 154. A second bushing 390 slides over the pin 378, is disposed within the cross hole 376 of the hoop 192, and abuts a second surface 392 of the eyelet 370 of the rod member 154. The second surface 392 of the eyelet 370 of the rod member 154 is opposite the first surface 388 of the eyelet 370 of the rod member 154. The second bushing 390 includes an extension 394 (e.g., a shelf or a flange) that extends diametrically beyond the cross hole 376 and abuts an outer surface 396 of the hoop 192. A forming process is applied to the non-headed end of the pin to retain the components together. This structure has the advantage of eliminating moment loading at the pivot interface.

FIG. 25 illustrates another embodiment of the rod member 154. The rod member 154 includes a bent portion 398 (e.g., a finger portion) that extends at an angle relative to (e.g., perpendicular to) an axis along a length of the handlebar 104 (e.g., a handlebar axis). In other embodiments, the rod member 154 may include more than one finger portion 398 extending in directions away from the handlebar axis, and/or the finger portion 398 may extend at a non-perpendicular angle relative to the handlebar axis (e.g., 60 degrees or 120 degrees relative to the handlebar axis)

The finger portion 398 extends into a bushing 400 (e.g., a pivot bushing). The embodiment shown in FIG. 25 has the advantage of requiring fewer and simpler components to make the pivotal connection. A moment load, however, is applied through the finger portion 398 of the rod member 154, which is more sensitive to tensile stresses. Therefore, the finger portion 398 may be sized to be sufficiently thick, and the rod member 154 may be made of a strong material in order to avoid breakage.

FIG. 26 illustrates yet another embodiment of the rod member 154. The rod member 154 and the pivot bushing 400 assemble in the same way as illustrated by FIG. 25. The finger portion 398, however, extends further beyond the pivot bushing 400 and is bent an additional time after assembly to secure the rod member 154 to the hoop 192. In other words, the finger portion 398 is bent at least times to secure the rod member 154 to the hoop 192 of the support 156.

Figure 27:
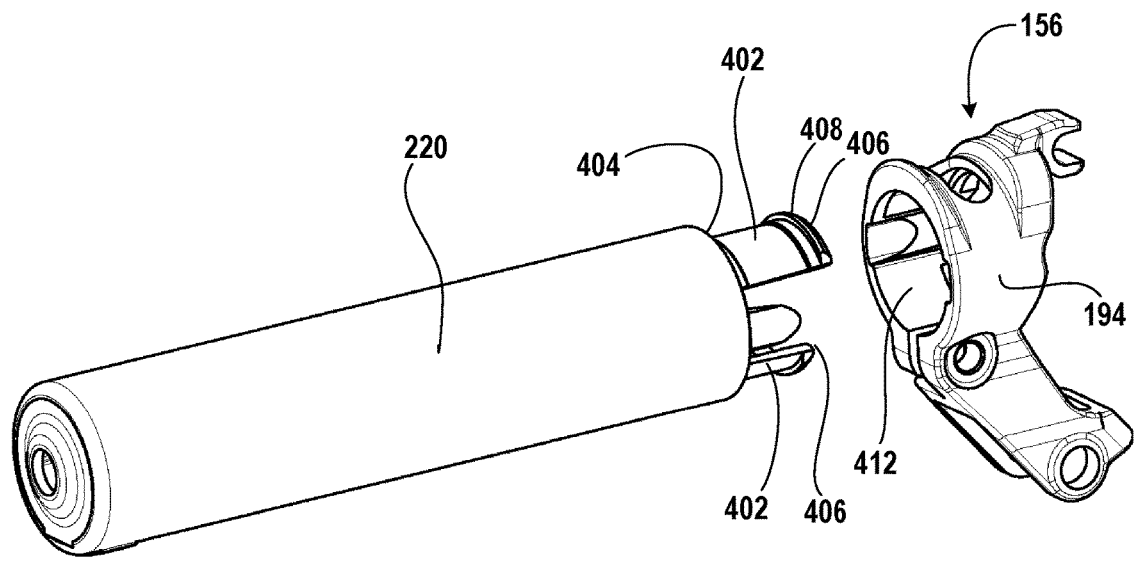
FIG. 27 is a first perspective exploded view of a grip and an actuator support.
Figure 28:
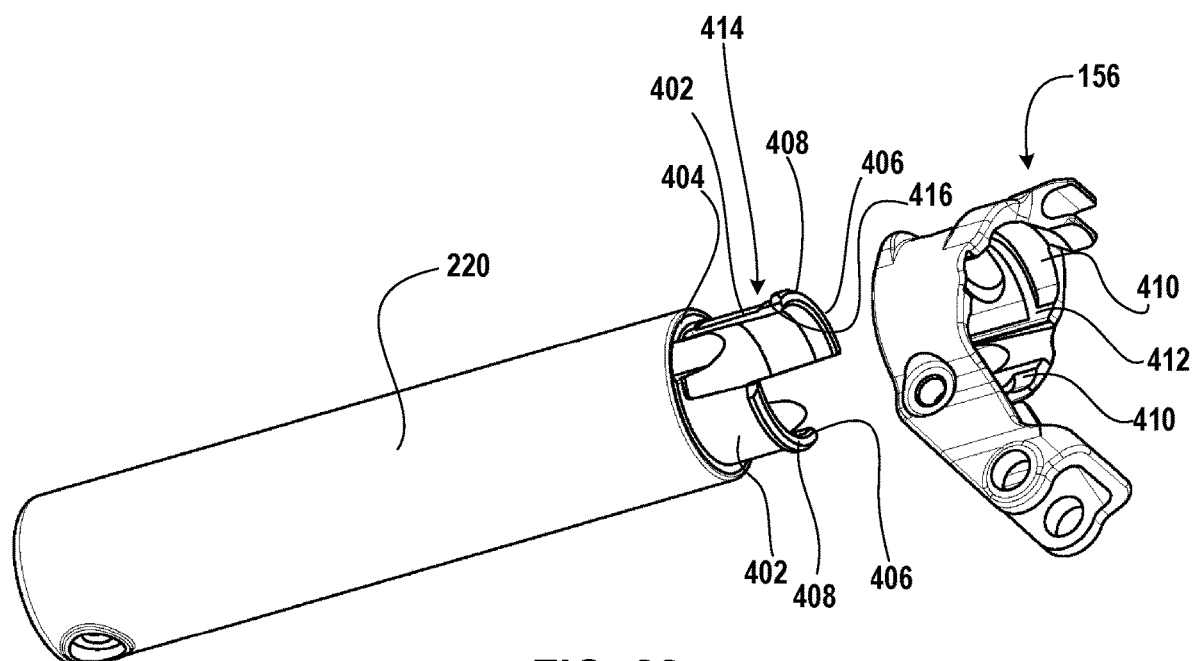
FIG. 28 is a second perspective exploded view of a grip and an actuator support.

FIGS. 27 and 28 illustrate an exemplary connection of the grip 220 with the clamp body 194 of the support 156. One or more extensions 402 (e.g., a pair of fingers) extend from an open end 404 of the grip 220. At or adjacent to an end 406 of each finger of the pair of fingers 402, the respective finger 402 includes a feature 408 (e.g., a shelf feature, a tab, or a flange). The ends 406 of the pair of fingers 402, respectively, are able to flex away from (e.g., towards a central axis extending with the length of the grip 220), and towards, the grip 220.

Referring to FIG. 28, the clamp body 194 includes one or more reliefs 410 (e.g., a pair of reliefs) that correspond to the one or more extensions 402 (e.g., the pair of fingers 402 and the shelf features 408). The shelf features 408, for example, are engageable with the pair of reliefs 410, respectively, so as to prevent axial movement of the grip 220 and the clamp body 194 relative to each other. When connecting the grip 220 to the clamp body 194 of the support 156, the ends 406 of the pair of fingers 402 are flexed away from the grip 220 and towards the central axis of the grip 220 by the clamp body 194 as the pair of fingers 402 are inserted into the clamp body 194. As the shelf features 408 move into the pair of reliefs 410, the fingers 402 are able to return (e.g., flex back) towards an original position and lock the clamp body 194 to the grip 220. In one embodiment, the shelf features 408 are in the original position when positioned in the reliefs 410 within the clamp body 194.

The reliefs 410 in the clamp body 194 extend circumferentially about an inner surface 412 of the clamp body 194, but not a complete 360 degrees. This prevents rotation of the grip 220 and the clamp body 194 relative to each other once the clamp body 194 and the grip 220 are mated together.

In the embodiment shown in FIGS. 27 and 28, at least one of the fingers 402 (e.g., a finger) includes a recess 414 on an outer surface 416 of the finger 402. The recess 414 provides clearance to allow for the accessory nut 308 to be disposed between the finger 402 and the corresponding inner relief 302 of the clamp body 194.

Figure 29:
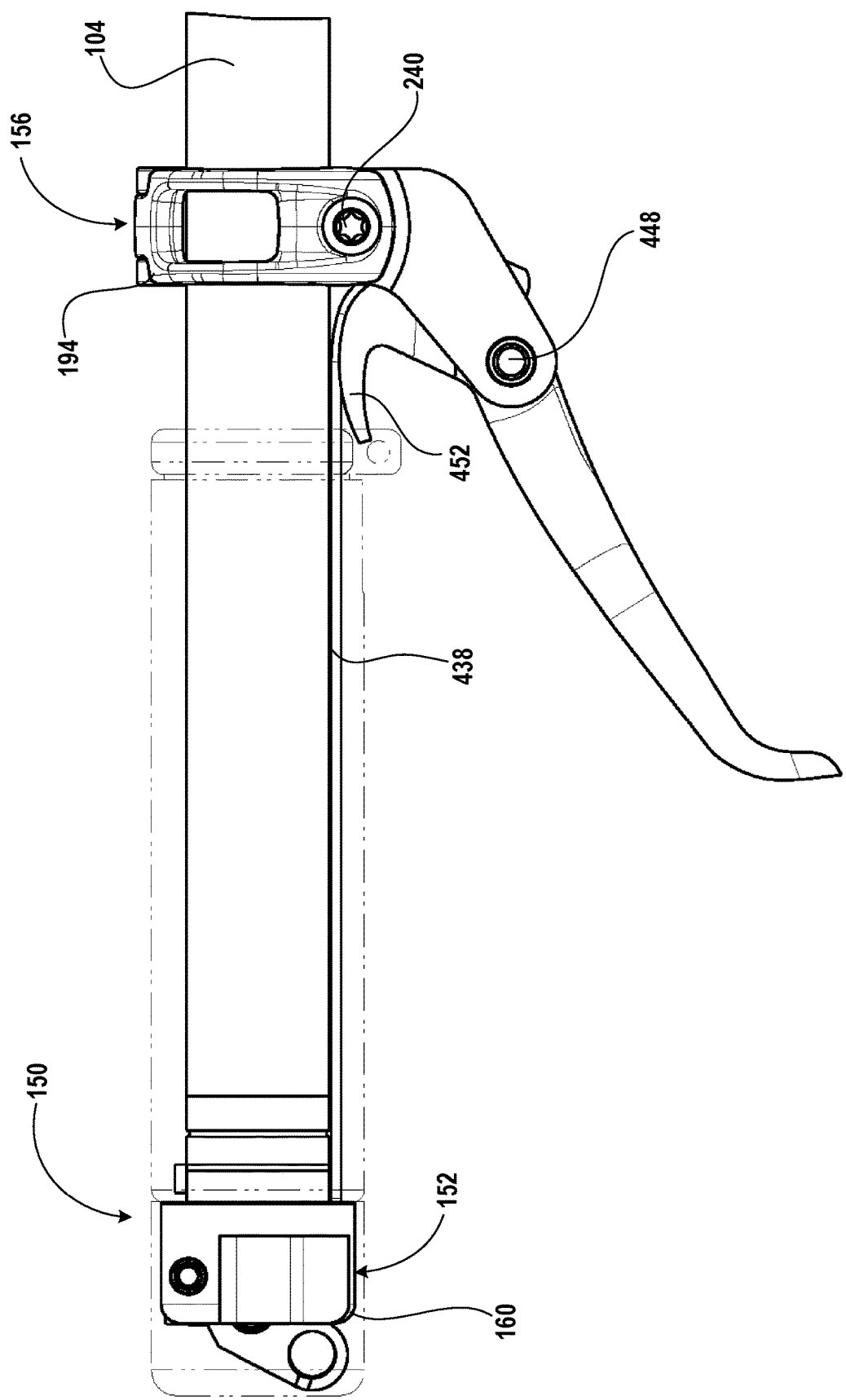
FIG. 29 is a side view of a second embodiment of a master cylinder assembly integrated with a handlebar of a bicycle, such as the bicycle of FIG. 1.
Figure 30:
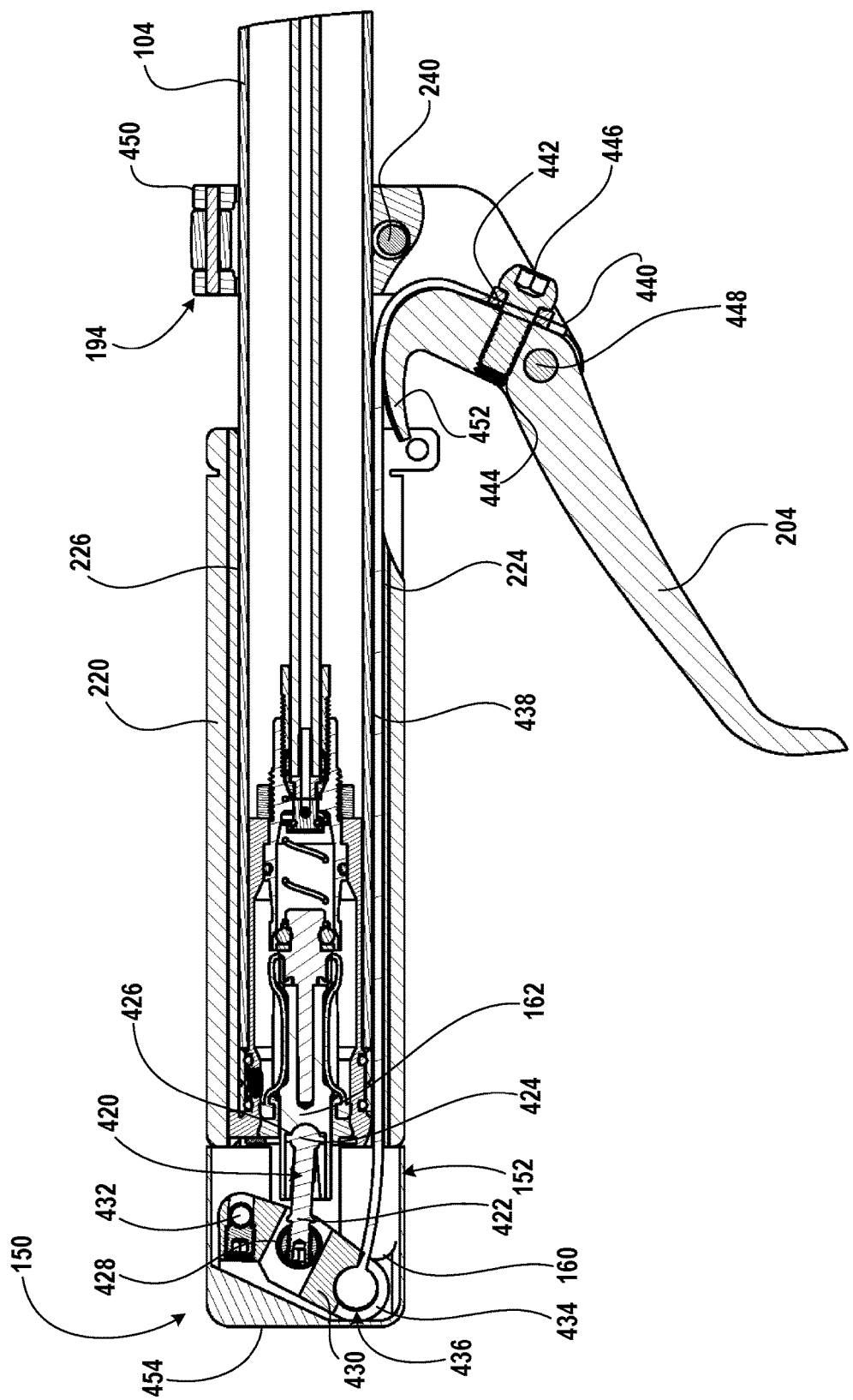
FIG. 30 is a side cross-sectional view of the handlebar integrated master cylinder assembly of FIG. 29 covered by a grip.
Figure 31:
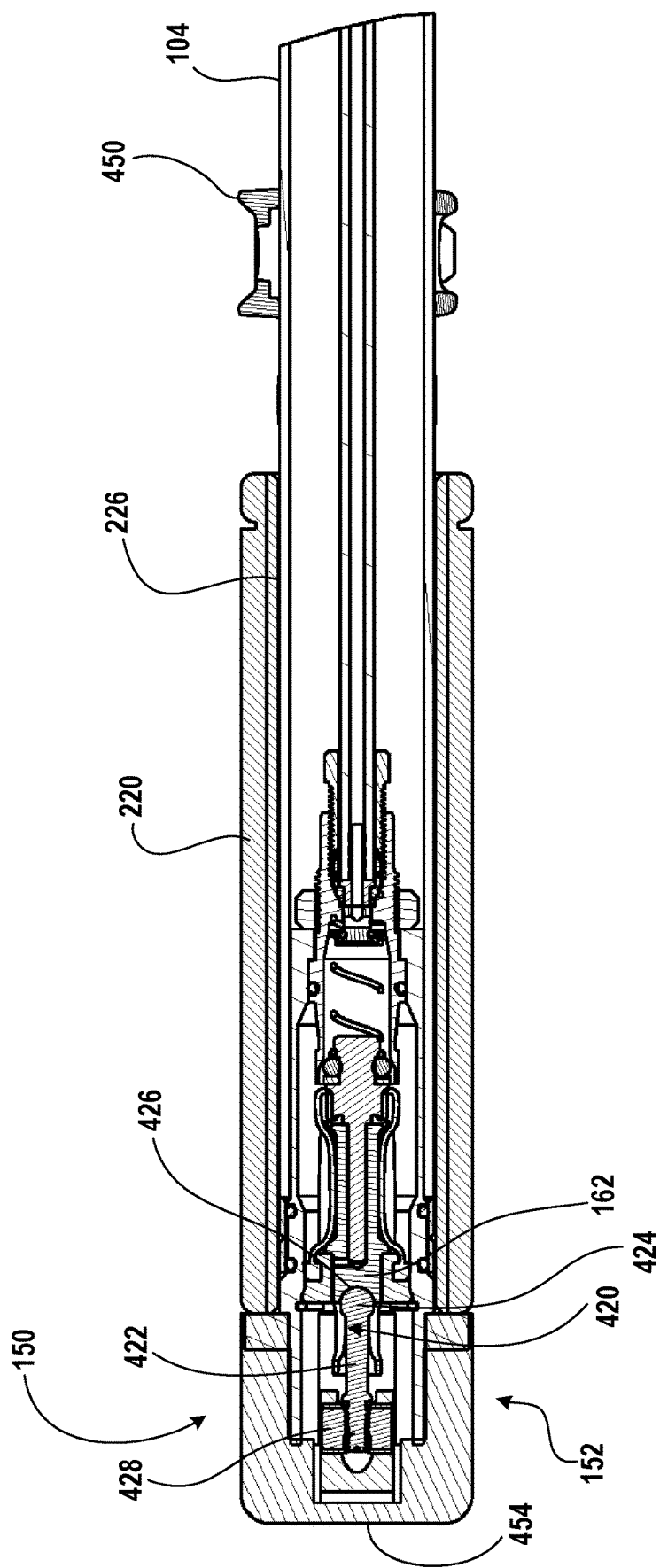
FIG. 31 is a top cross-sectional view of the handlebar integrated master cylinder assembly of FIG. 29 covered by a grip.

FIGS. 29-34 illustrate an alternative embodiment of the master cylinder assembly 150 that includes a single rod member. The master cylinder 152 and components within the master cylinder 152 generally follow the same construction illustrated for the embodiment shown in FIGS. 2-28. The piston 162 is coupled to a connector 420. The connector 420 may take any number of different forms. For example, as illustrated in FIGS. 30 and 31, the connector 420 may include a pushrod 422, and the pushrod 422 may include a ball 424 at one end of the pushrod 422. An end of the piston 162 includes a socket 426, and the ball 424 of the pushrod 422 is disposed within the socket 426. The connection between the ball 424 and the socket 426 allows the pushrod 422 to rotate (e.g., pivot) relative to the socket 426 of the piston 162.

The pushrod 422 is connected to a cross pin 428 (e.g., a cross dowel) that is pivotally mounted within a link 430. The link 430 is pivotally coupled 432 (e.g., via a pin and a corresponding opening) to the housing 160 of the master cylinder 152. A pivot axis of the pivotable coupling 432 is offset a distance away from the handlebar axis and is perpendicular to the handlebar axis.

At or adjacent to an end 434 of the link 430, the link 430 is pivotally connected 436 to a rod member 438. The rod member 438 extends in the axial direction along the handlebar 104 within a channel 224 disposed within the inner surface 226 of the grip 220.

In the embodiment shown in FIGS. 29-34, the rod member 438 is a flexible cable, but other more rigid materials may be used instead. An opposing end 440 of the rod member 438 is connected (e.g., fastened) to the blade 204. For example, the rod member 438 includes an opening 442 adjacent to the end 440 of the rod member 438, and the blade 204 includes a corresponding opening 444 (e.g., a threaded opening). A connector 446 (e.g., a bolt) extends through the opening 442 through the rod member 438 and, for example, extends through and engages with the opening 444 of the blade 204 to connect the rod member 438 to the blade 204. The embodiment illustrated has a simplified arrangement, but more complex assemblies allowing for adjustment of an initial position of the blade 204 may be provided.

The blade 204 is pivotally mounted to the clamp body 194 (e.g., via a pivotable connection 448). The clamp body 194 may be connected to the handlebar 104 in any number of ways. For example, the clamp body 194 may include hinged clamp pieces 450 (e.g., a pair of hinged clamp pieces). The clamping bolt 240 may secure the pair of hinged clamp pieces 450 together and on the handlebar 104.

In this embodiment, the clamp body 194 and the grip 220 are secured separately to the handlebar 104 and are not rotatably fixed relative to each other. Alternative arrangements may mate the clamp body 194 and the grip 220 together and fix rotation relative to each other, similar to the embodiment shown in FIGS. 2-28.

Figure 32:
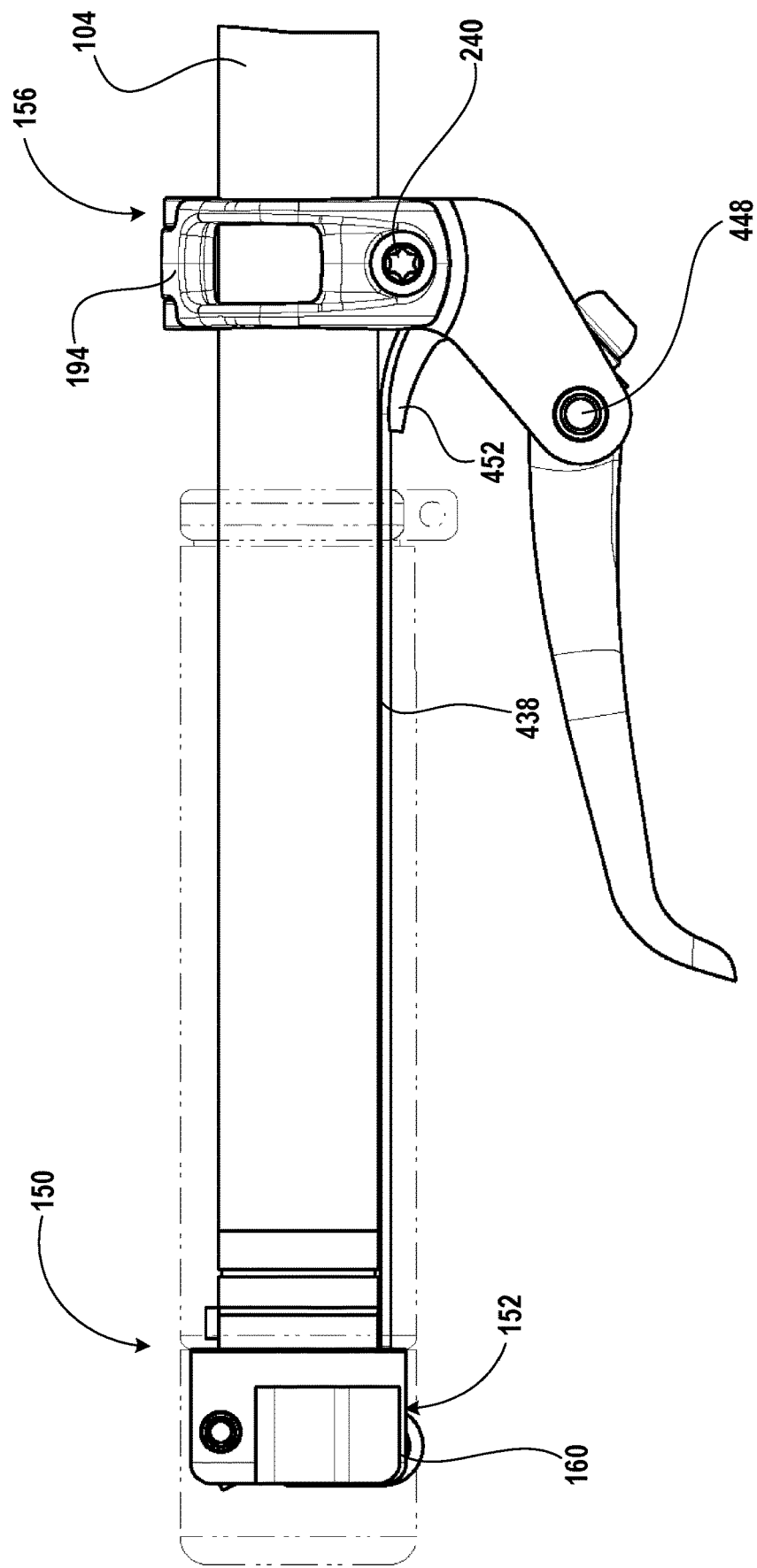
FIG. 32 is a side view of the handlebar integrated master cylinder assembly of FIG. 2, with a lever actuated.
Figure 33:
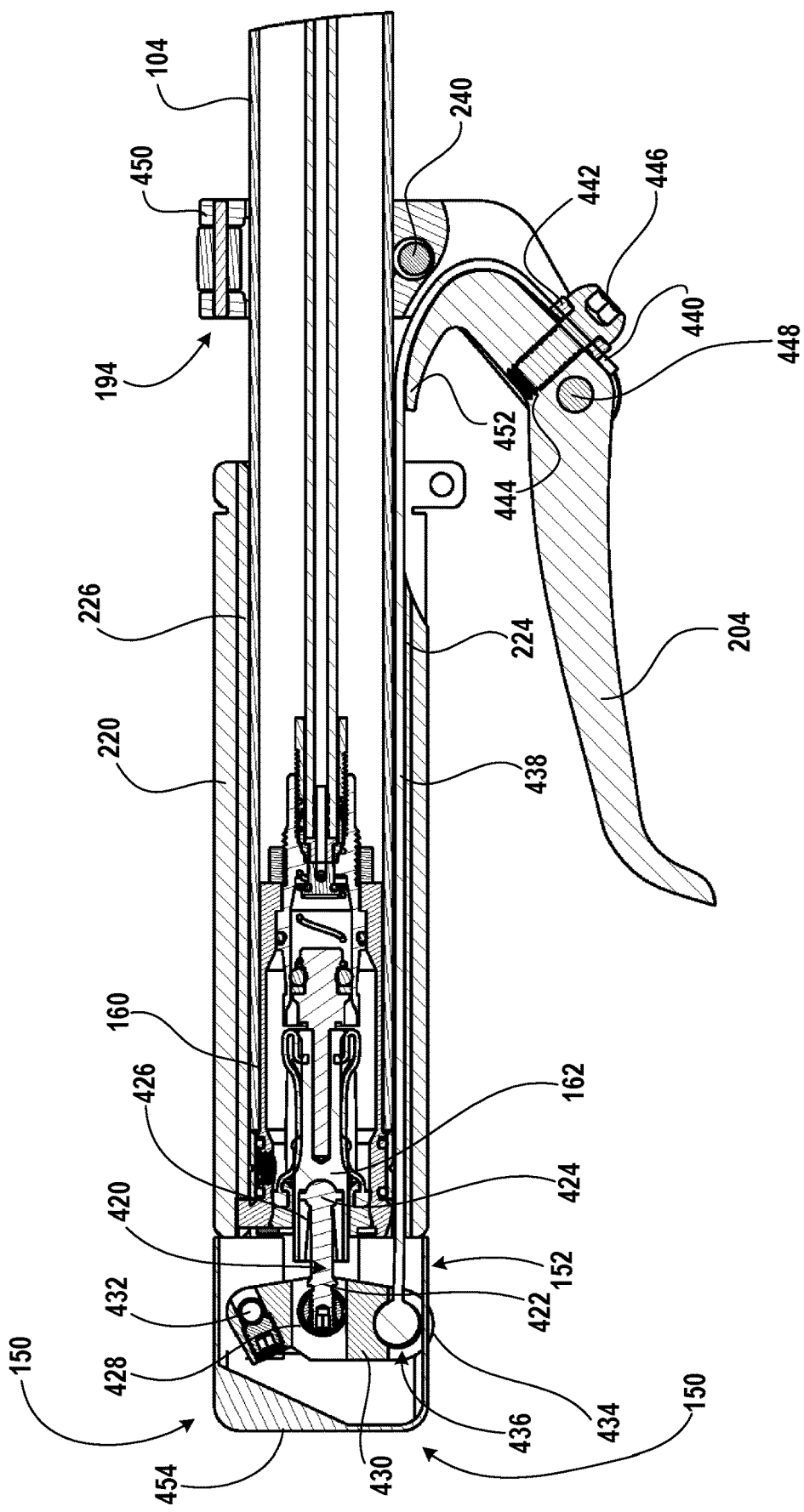
FIG. 33 is a side cross-sectional view of the handlebar integrated master cylinder assembly of FIG. 32 covered by a grip.
Figure 34:
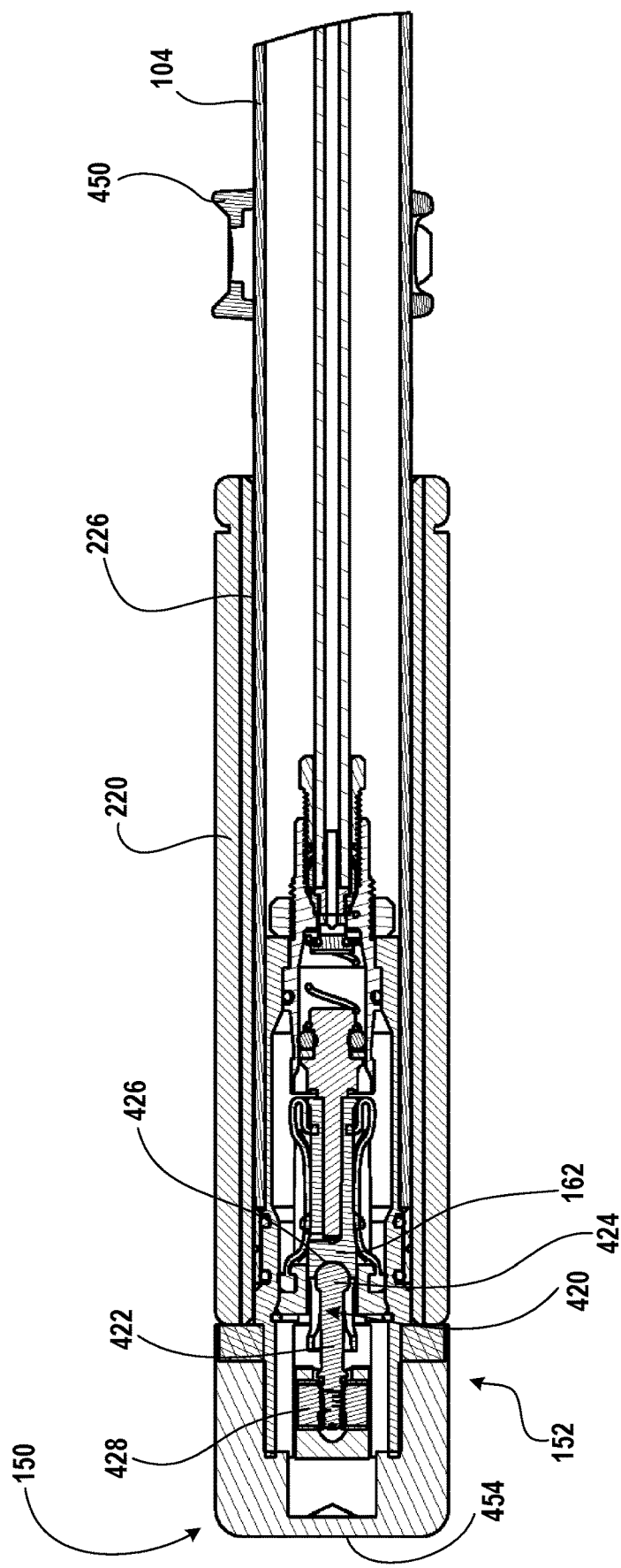
FIG. 34 is a top cross-sectional view of the handlebar integrated master cylinder assembly of FIG. 32 covered by a grip.

FIGS. 29-31 illustrate the master cylinder assembly 150 in an initial position before the user applies a hand load to the blade 204. FIGS. 32-34 illustrate an engaged position, in which load is applied to the blade 204 with the hand of the user, and fluid pressure is generated within a hydraulic portion of the master cylinder assembly 150.

The blade 204 includes a guide portion 452 that facilitates the pulling of the rod member 438 away from an end 454 (e.g., a closed end) of the grip 220. As the user applies a load to the blade 204, the blade 204 pivots about the pivotable connection 448 of the blade 204 to the clamp body 194, and the rod member 438, which is attached to the blade 204, is pulled towards the clamp body 194 and away from the end 454 of the grip 220. This pulling motion causes the link 430 to pivot about the pivotable coupling 432. This pivoting motion of the link 430 causes, due to the connection of the link 430 to the piston 162 via the pushrod 422, for example, the piston 162 to translate in a direction towards the second cylindrical portion 180. The translation of the piston 162 closes the hydraulic system and activates the brake caliper of the hydraulic actuation system.

FIGS. 35-40 illustrate an alternative configuration of the master cylinder assembly 150 that is simplified compared to the embodiment shown in FIGS. 2-28. The master cylinder assembly 150 utilizes the two rod members 154, the hoop 192, and the cam 198 similar to the previous illustrations.

This embodiment has a fixed dead-stroke length, where previous embodiments incorporated an adjustment mechanism to allow the user to change the dead-stroke length. For example, as shown in FIGS. 35-40, the two rod members 154 may be fixed to the piston 162 with two connectors 456, respectively. The connectors 456 may be any number of different types of connectors including, for example, bolts that extend into corresponding openings 458 (e.g., threaded openings) in the piston 162. The connection of the two rod members 154 to the piston 162 via the connectors 456 may not allow for adjustment of the dead-stroke length.

In one embodiment, the piston 162 includes extensions 459 (e.g., two extensions) that each extend in a direction away from the central axis of the handlebar 104. For example, the extensions 459 extend in directions perpendicular to the central axis of the handlebar 104. The two rod members 154 connect to the piston 162 at the extensions 459 via the connectors 456, respectively. The extensions 459 may be integral with the piston 162. Alternatively, as shown in FIGS. 35-40, the extensions 459 may be part of a T-shaped connector 460 that connects the two rod members 154 to the piston 162 with the bolts 456, for example.

Figure 35:
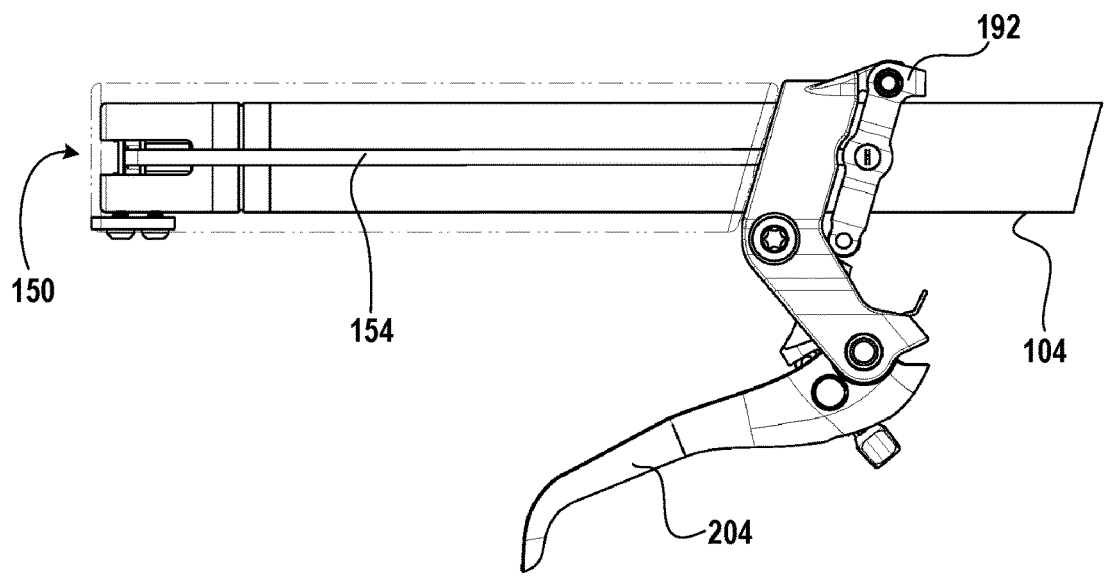
FIG. 35 is a side view of a third embodiment of a master cylinder assembly integrated with a handlebar of a bicycle, such as the bicycle of FIG. 1.
Figure 36:
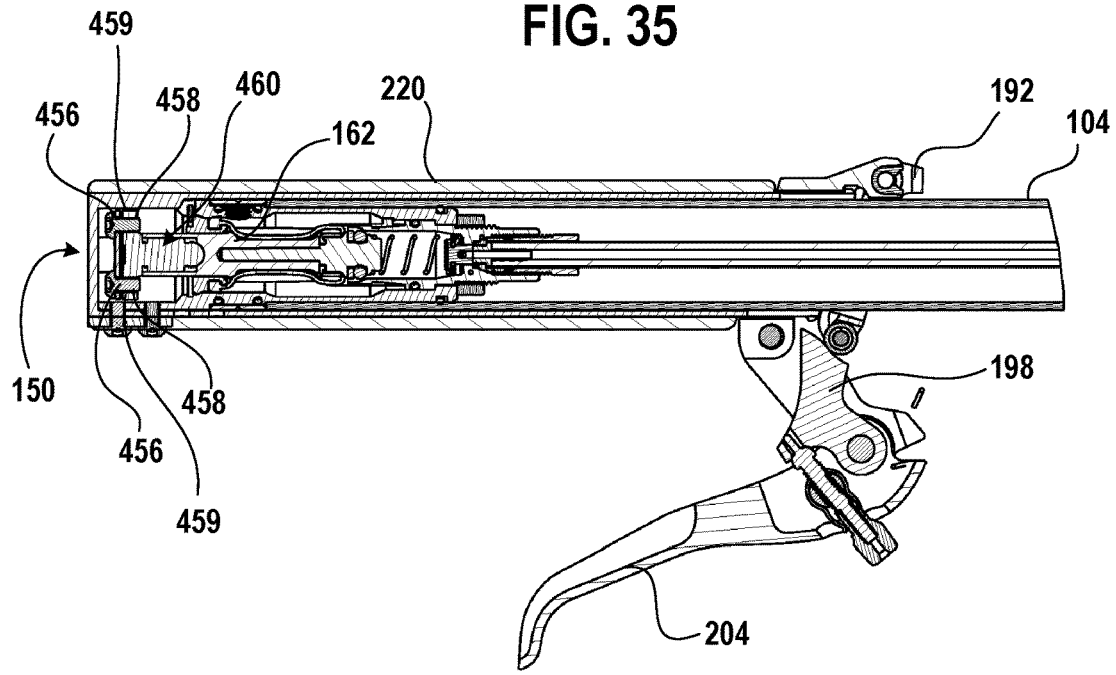
FIG. 36 is a side cross-sectional view of the handlebar integrated master cylinder assembly of FIG. 35 covered by a grip.
Figure 37:
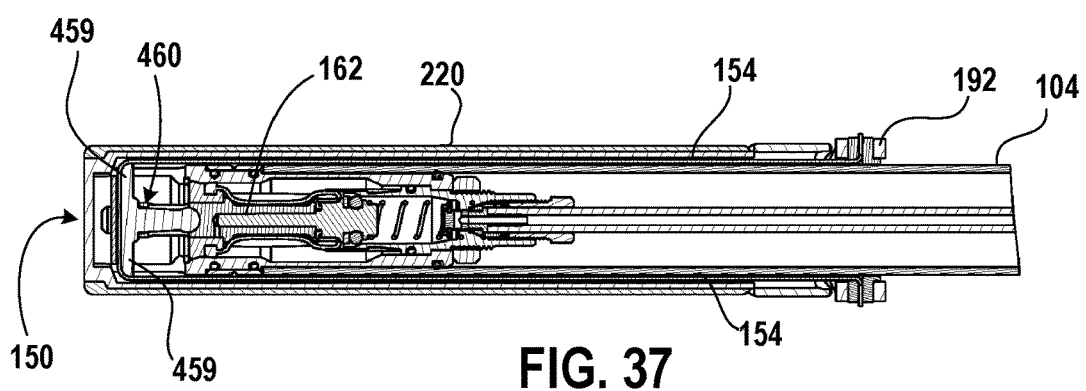
FIG. 37 is a top cross-sectional view of the handlebar integrated master cylinder assembly of FIG. 35 covered by a grip.
Figure 38:
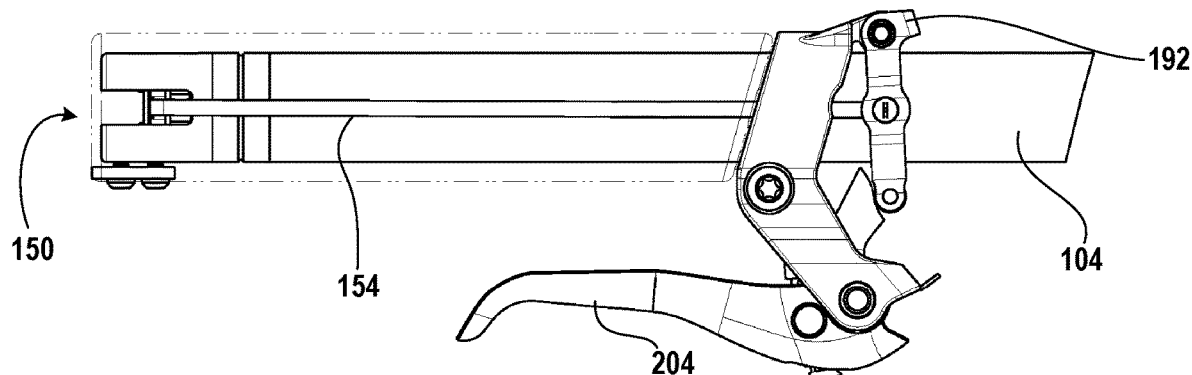
FIG. 38 is a side view of the handlebar integrated master cylinder assembly of FIG. 35, with a lever actuated.
Figure 39:
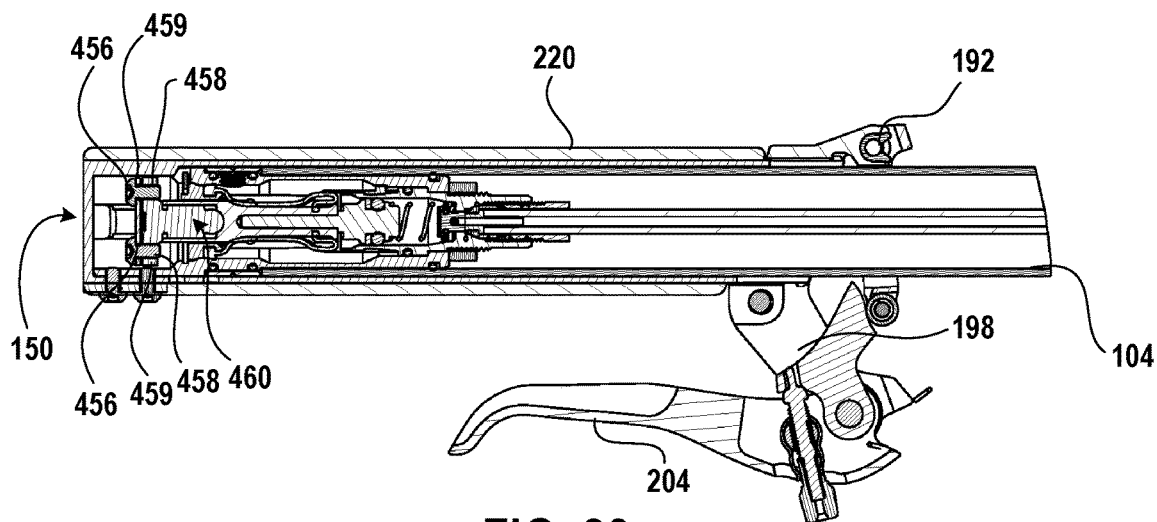
FIG. 39 is a side cross-sectional view of the handlebar integrated master cylinder assembly of FIG. 38 covered by a grip.
Figure 40:
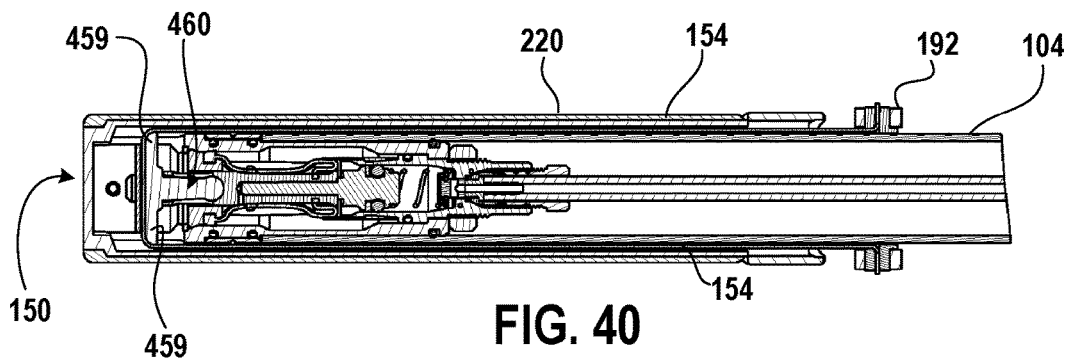
FIG. 40 is a top cross-sectional view of the handlebar integrated master cylinder assembly of FIG. 38 covered by a grip.

FIGS. 35-37 illustrate an initial condition before user hand loading is applied to the blade 204. FIGS. 38-40 illustrate an engaged position, in which the load by the hand of the user has been applied, and fluid pressure is generated within the hydraulic portion of the master cylinder assembly 150.

The master cylinder assembly 150 of the present disclosure places one or more hydraulic hoses 218 within the handlebar 104. The one or more hydraulic hoses 218 are to be connected to the brake caliper located at the front wheel 108 of the bicycle 100 and/or the brake caliper located at the rear wheel 112 of the bicycle 100 in order to operate. Therefore, a pathway is to be provided for the hose 218 to exit the handlebar 104.

Figure 41:
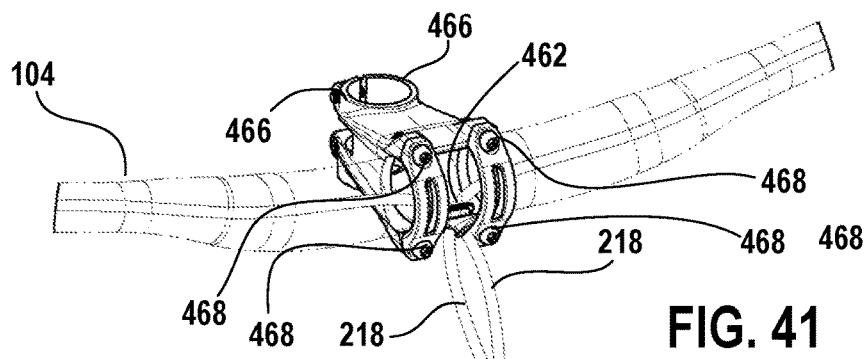
FIG. 41 is a perspective view of a portion of a handlebar assembly of a bicycle, such as the bicycle of FIG. 1, illustrating a first exemplary hose pathway.

FIG. 41 illustrates an exemplary way for extracting the one or more hoses 218 (e.g., two hoses) from the handlebar 104. The handlebar 104 includes an opening 462 placed in an approximate center of the handlebar 104 (e.g., a center opening). The handlebar 104 is secured to a stem by a clamp including one or more clamp pieces 466 and one or more connectors 468 (e.g., a stem clamp bolt). For the purposes of reducing abrasion, a grommet made of any number of materials including, for example, rubber may be placed in the opening 462 within the handlebar 104. The rubber grommet, for example, may include one or more openings to allow for passage of the hose 218. In one embodiment, the rubber grommet includes a circumferential groove, such that the rubber grommet may be retained within the opening 462 through the handlebar 104. Once the hose 218 has exited the handlebar 104, the hose 218 may run externally to the brake caliper or be routed internally through other portions of the bicycle 100.

Figure 42:
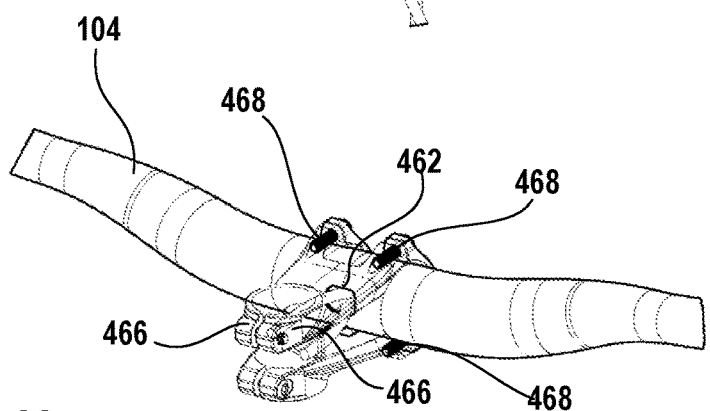
FIG. 42 is a perspective view of a portion of a handlebar assembly of a bicycle, such as the bicycle of FIG. 1, illustrating a second exemplary hose pathway.

FIG. 42 illustrates an alternative way for extracting the hose 218 from the handlebar 104. With the arrangement of FIG. 42, the opening 462 through the handlebar 104 faces the stem instead of away from the stem, as shown in FIG. 41. Once inside the stem, the hose 218 may either pass through the stem to an exterior of the bicycle 100 or pass through the stem into a steer tube of a fork. Alternatively, the hose 218 may pass through the stem and directly into the frame 102 of the bicycle 100.

Figure 43:
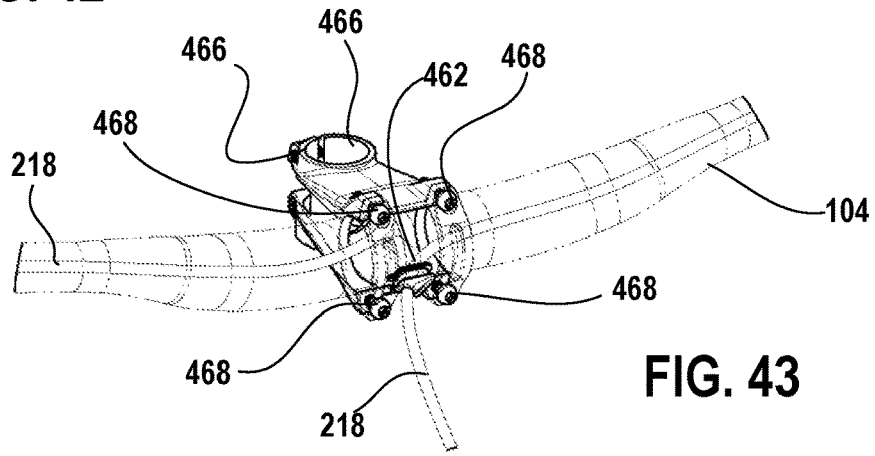
FIG. 43 is a perspective view of a portion of a handlebar assembly of a bicycle, such as the bicycle of FIG. 1, illustrating a third exemplary hose pathway.
Figure 44:
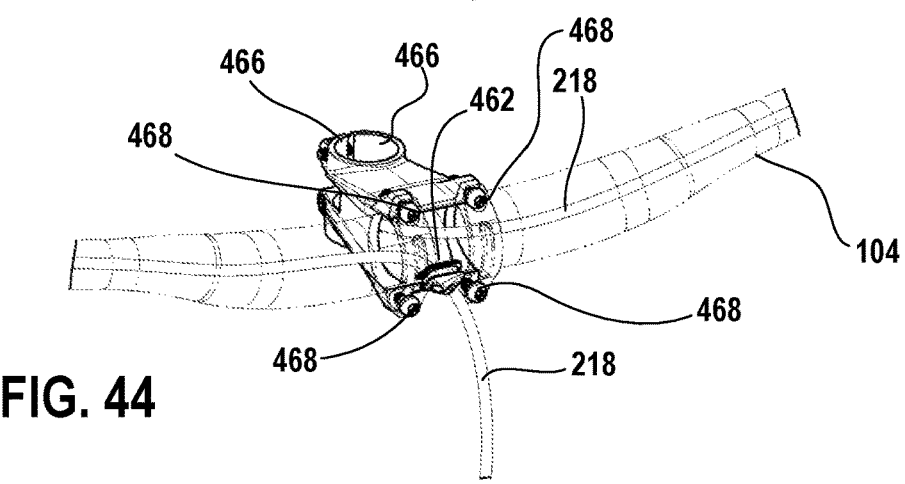
FIG. 44 is a perspective view of a portion of a handlebar assembly of a bicycle, such as the bicycle of FIG. 1, illustrating a fourth exemplary hose pathway.

FIGS. 43 and 44 illustrate additional arrangements for extracting the hose 218 from the handlebar 104. The arrangements of FIGS. 43 and 44 are essentially combinations of FIGS. 41 and 42, where a first hose 218 of a first side of the bicycle 100 (e.g., of a first master cylinder assembly 150) is routed through the center opening 462 of the handlebar 104 externally, and a second hose 218 of a second side of the bicycle 100 (e.g., of a second master cylinder assembly 150) is routed through the center opening 462 of the handlebar 104 internal to the stem. FIGS. 43 and 44 show hoses 218 from different sides of the bicycle 100 exiting the center opening 462.

The hose pathway arrangements described above may be used in combination with any of the embodiments described above for integrating the master cylinder assembly 150 within the handlebar 104. Unlike configurations of the prior art, in which a number of holes are added to strength critical areas of the handlebar 104 to allow for exit of the hydraulic hoses 218, in the embodiments described with reference to FIGS. 41-44, the hydraulic hoses 218 exit the handlebar 104 through a single center opening 462 through the handlebar 104, which is outside of the strength critical areas. The single center opening 462 through the handlebar 104 outside of the strength critical areas of the handlebar 104 does not compromise the structural integrity of the handlebar 104.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A fluid cylinder assembly for a hydraulic actuation system for a bicycle, the fluid cylinder assembly comprising:

a fluid cylinder comprising a housing and a piston that is movable within the housing;
a force applicator connected to the piston of the fluid cylinder;
a support; and
an actuator pivotably attached to the support and operatively connected to the piston of the fluid cylinder via the force applicator, such that the actuator is configured to translate the piston from a first position to a second position when the actuator is actuated,
wherein the fluid cylinder is attachable to a handlebar of the bicycle, such that part of the fluid cylinder is positioned within the handlebar and at least a portion of the force applicator is radially outer relative to the handlebar,
wherein the force applicator is a pull rod member, the pull rod member being under tensile load when the actuator is actuated.

2. The fluid cylinder assembly of claim 1, wherein the actuator includes a lever.

3. The fluid cylinder assembly of claim 1, wherein the pull rod member is a first pull rod member, and
wherein the fluid cylinder assembly further comprises a second pull rod member connected to the piston of the fluid cylinder, the second pull rod member being opposite the first pull rod member.

4. The fluid cylinder assembly of claim 1, wherein the force applicator is a flexible cable.

5. The fluid cylinder assembly of claim 1, wherein the housing of the fluid cylinder includes a fluid chamber having a first portion and a second portion, the first portion of the fluid chamber being in communication with the hydraulic actuation system,
wherein the piston is movable within the fluid chamber of the housing of the fluid cylinder,
wherein the first position of the piston is an open position permitting fluid flow between the first portion of the fluid chamber and the second portion of the fluid chamber, and the second position of the piston is a closed position blocking fluid flow between the first portion of the fluid chamber and the second portion of the fluid chamber.

6. The fluid cylinder assembly of claim 5, further comprising an adjuster configured to adjust a location of the first position of the piston relative to the housing of the fluid cylinder, such that a distance between the first position of the piston and the second position of the piston is adjusted.

7. The fluid cylinder assembly of claim 1, wherein the support has a first portion and a second portion, the first portion of the support being pivotably attached to the second portion of the support,
wherein the actuator is pivotably attached to the second portion of the support,
wherein the second portion of the support has an inner annular surface, the inner annular surface defining a clamp surface axis and a clamp plane, the clamp surface axis extending along the inner annular surface and the clamp plane being perpendicular to the claim surface axis and intersecting the second portion of the support,
wherein at least part of the force applicator is radially outer relative to the clamp surface axis.

8. The fluid cylinder assembly of claim 7, wherein the fluid cylinder and an end of the actuator are disposed on a same side of the clamp plane.

9. The fluid cylinder assembly of claim 7, further comprising a hose connector supported by the housing of the fluid cylinder,
wherein the hose connector is radially inner relative to the clamp surface axis.

10. The fluid cylinder assembly of claim 9, wherein the fluid cylinder and the hose connector are on a same side of the clamp plane.

11. The fluid cylinder assembly of claim 1, wherein the part of the fluid cylinder is a first portion of the fluid cylinder, and the fluid cylinder also has a second portion, and
wherein the fluid cylinder is attachable to the handlebar of the bicycle, such that the second portion of the fluid cylinder is positioned outside of the handlebar and abuts an end of the handlebar.

12. The fluid cylinder assembly of claim 11, wherein the fluid cylinder is attachable to the handlebar of the bicycle, such that the piston of the fluid cylinder extends beyond the end of the handlebar.

13. The fluid cylinder assembly of claim 11, further comprising:
a grip covering an outer surface of the second portion of the fluid cylinder; and
a connector connecting the grip to the fluid cylinder via an opening through the grip and an opening through the second portion of the fluid cylinder.

14. The fluid cylinder assembly of claim 13, wherein the grip has an inner surface and a channel extending from the inner surface into the grip, and
wherein the force applicator is disposed within the channel of the grip.

15. A fluid cylinder assembly for a hydraulic actuation system for a bicycle, the fluid cylinder assembly comprising:
a fluid cylinder comprising a housing and a piston that is movable within the housing; and
a first tensile member and a second tensile member opposite the first tensile member, the first tensile member and the second tensile member being connected to the piston of the fluid cylinder, wherein the first tensile member and the second tensile member are configured to translate the piston of the fluid cylinder when axial forces are applied to the first tensile member and the second tensile member, respectively,
wherein the first tensile member is a first pull rod member, and the second tensile member is a second pull rod member, and
wherein the fluid cylinder is attachable to a handlebar of the bicycle, such that part of the fluid cylinder is positioned within the handlebar and at least a portion of the first pull rod member and at least a portion of the second pull rod member are radially outer relative to the handlebar.

16. The fluid cylinder assembly of claim 15, further comprising:
a support having a first portion and a second portion, the first portion of the support being pivotably attached to the second portion of the support, wherein the first pull rod member and the second pull rod member are connected to the first portion of the support; and
an actuator pivotably attached to the second portion of the support and operatively connected to the piston of the fluid cylinder via the first pull rod member and the second pull rod member, such that the actuator is configured to translate the piston when the actuator is actuated.

17. A handlebar assembly for a bicycle, the handlebar assembly comprising:
a handlebar;
a fluid cylinder assembly for a hydraulic actuation system for the bicycle, the fluid cylinder assembly comprising:
   a fluid cylinder attached to the handlebar, the fluid cylinder comprising a housing and a piston that is movable within the housing, the fluid cylinder having a first portion and a second portion;
   a force applicator connected to the piston of the fluid cylinder;
   a support attached to the handlebar; and
   an actuator pivotably attached to the support and operatively connected to the piston of the fluid cylinder via the force applicator, such that the actuator is configured to translate the piston when the actuator is actuated;
a grip covering an outer surface of the second portion of the fluid cylinder; and
a connector connecting the grip to the fluid cylinder via an opening through the grip and an opening through the second portion of the fluid cylinder,
wherein the first portion of the fluid cylinder is disposed within the handlebar, and the second portion of the fluid cylinder is disposed outside of the handlebar and abuts an end of the handlebar,
wherein at least a portion of the force applicator is radially outer relative to the handlebar,
wherein the support has a first portion and a second portion, the first portion of the support being pivotably attached to the second portion of the support,
wherein the force applicator is connected to the first portion of the support, and the actuator is pivotably attached to the second portion of the support, and
wherein part of the grip is disposed between the second portion of the support and the handlebar, and the grip is attached to the handlebar via the attachment of the support to the handlebar.

* * * * *